United States Patent
Ushioda et al.

(10) Patent No.: US 6,410,662 B1
(45) Date of Patent: Jun. 25, 2002

(54) PROCESS FOR THE PREPARATION OF OLEFIN (CO) POLYMERS, OLEFIN COPOLYMERS, AND APPLICATION THEREOF

(75) Inventors: Tsutomu Ushioda, Ichihara; Jun Saito, Kimitsu; Mototake Tsutsui, Ichihara; Yoshitoyo Yasuda, Ichihara; Hiroyuki Fujita, Ichihara; Toshihiro Uwai, Ichihara; Yoshiyuki Ohgi, Yokoshiba-machi; Minoru Adachi, Ichihara; Yoshitaka Morimoto, Ichihara; Taketo Hirose, Ichihara; Youichi Kugimiya, Ichihara; Masahiko Taniguchi, Narita; Hitoshi Kuramochi, Ichihara, all of (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/485,492

(22) PCT Filed: Aug. 12, 1998

(86) PCT No.: PCT/JP98/03597

§ 371 (c)(1),
(2), (4) Date: May 9, 2000

(87) PCT Pub. No.: WO99/07747

PCT Pub. Date: Feb. 18, 1999

(30) Foreign Application Priority Data

Aug. 12, 1997 (JP) .............................. 9-217899
Aug. 13, 1997 (JP) .............................. 9-218756
Sep. 17, 1997 (JP) .............................. 9-251689
Sep. 19, 1997 (JP) .............................. 9-273577

(51) Int. Cl.$^7$ ................................. C08F 4/44
(52) U.S. Cl. ................ 526/127; 526/158; 526/160; 526/943; 526/351; 502/152
(58) Field of Search .................. 526/160, 943, 526/351, 348.6, 158, 159, 127; 502/152

(56) References Cited

U.S. PATENT DOCUMENTS

| | | | | |
|---|---|---|---|---|
| 5,756,609 A | * | 5/1998 | Cohen | 526/127 |
| 6,096,843 A | * | 8/2000 | Saito et al. | 526/127 |
| 6,268,518 B1 | * | 7/2001 | Resconi et al. | 556/43 |

* cited by examiner

Primary Examiner—David W. Wu
Assistant Examiner—R. Harlan
(74) Attorney, Agent, or Firm—Leydig, Voit & Mayer, Ltd.

(57) ABSTRACT

Disclosed is a process for producing olefin polymers or copolymers which can freely regulates the molecular weight of the polymers or copolymers as well as novel olefin polymers or copolymers excellent in rigidity, heat-resisting property and transparency, moldings and compositions thereof which find a wide variety of applications in versatile industrial parts including containers, films, sheets, filaments or fibers, featured by (1) a process for producing olefin polymers or copolymers by the aid of a catalyst comprised predominantly of the compounds: (A) a transition metal compound of the formula: $Q(C_5H_{4-m}R^1{}_m)(C_5H_{4-n}R^2{}_n)$ MXY, (B) an aluminoxane, (C) a fine particulate carrier, and (D) an organoaluminum compound; (2) olefin polymers or copolymers characterized by (a) a specific ratio of isotactic pentad, (b) 2,1- and 1.3-propylene units contents in the polymer chain, (c) a specific Mw, (d) a specific Mw/Mn, and (e) in case of elevating temperature of o-dichlorobenzene continuously or stepwise up to given temperatures to measure the amount of eluated polyolefin at each temperature, the position of a main elution peak and the amount of components existing in the range of ±10° C. of the main elution peak; (3) injection moldings, films, filaments or fibers, and non-woven fabric of the polypropylene obtained; and (4) a composition comprising the polypropylene obtained and an α-nucleating agent or a composition comprising the polypropylene and a radical generator and having been produced by subjecting to the mixture to melt-kneading.

24 Claims, 7 Drawing Sheets

PROCESS FOR THE PREPARATION OF OLEFIN (CO) POLYMERS, OLEFIN COPOLYMERS, AND APPLICATION THEREOF

TECHNICAL FIELD

The present invention relates to a process for producing olefin polymers or copolymers capable of being controlled in molecular weight as well as novel olefin polymers or copolymers and applications thereof. More particularly, the present invention relates to a process for producing olefin polymers or copolymers of a high molecular weight wherein a polymerization time or an average retention time in a polymerization reactor is adjusted by the aid of a specific metallocene catalyst thereby enabling control of the molecular weight at the time of producing the olefin polymers or copolymers and adjustment of the molecular weight to a higher molecular weight range as well as novel olefin polymers or copolymers and injection moldings excellent in rigidity and heat-resistance, especially molded from polypropylene; films excellent in transparency in addition to the above characteristics; a composition comprising the aforesaid polypropylene and an α-form nucleating agent; a modified composition which is comprised predominantly of the aforesaid polypropylene and a radical generator and has been subjected to melt-kneading treatment; and filaments or fibers or non-woven fabrics of the aforesaid propylene polymers or copolymers.

BACKGROUND ART

Olefin polymers or copolymers such as polypropylene or polyethylene are excellent in mechanical properties and chemicals-resistance and are very useful in balance to an economic aspect so that they are employed in the field of various moldings. From the past, these olefin polymers or copolymers were produced by polymerizing or copolymerizing olefins by the aid of a so-called Ziegler-Natta catalyst which is a combination of a transition metal catalytic component comprising titanium trichloride and/or tetrachloride carried on a support such as magnesium chloride with an organoaluminum compound.

In recent years, on the other hand, a process for producing olefin polymers or copolymers by polymerizing or copolymerizing olefins by the aid of a new catalyst different from the conventional catalyst system has widely been utilized, the new catalyst being comprised of a metallocene and an aluminoxane. Olefin polymers or copolymers produced by way of this metallocene catalyst system are distinguished themselves by their narrow molecular weight distribution and by the fact that in case of copolymers, the comonomer has homogeneously been copolymerized therein so that olefin polymers or copolymers which are more homogeneous than the conventional olefin polymers or copolymers can be obtained.

In the production of olefin polymers or copolymers by the aid of such metallocene catalyst system, however, there is a problem that the molecular weight of the resultant olefin polymers or copolymers are generally poor or that the molecular weight of olefin polymers or copolymers obtained at a practical but a higher polymerization temperature are too low to be used practically.

As is seen in Japanese Laid-open Patent Appln. No. Sho. 63-251405, It is known that the molecular weight of olefin polymers or copolymers can be increased by using a metallocene compound including hafnium as a transitions metal. In case of the hafnium compound, however, the polymerization activity is poor and not practical.

In Journal of Molecular Catalysis A: Chemical 102, 59–65 (1995), there is disclosed that the molecular weight of olefin polymers or copolymers can be increased by lowering the polymerization temperature. In case the polymerization temperature is lowered, however, the polymerization activity becomes extremely poor. Thus, such a method cannot be said to be practical, too.

It is disclosed in Japanese Laid-open Patent Appln. No. Hei. 6-100579 that the molecular weight of olefin polymers or copolymers can be increased by using a catalyst wherein the metallocene compound has a complicate structure. In this case, however, the synthetic route of such metallocene compound having a complicate structure becomes complicate so that cost for manufacturing the catalyst becomes too high to be practical. It is also disclosed in Macromol. Symp. 97, 205–216 (1995) that the molecular weight of olefin polymers or copolymers can be increased by increasing the monomer concentration in the polymerization system or raising the polymerization pressure. As is described in the aforesaid Journal of Molecular Catalysis A: Chemical 102, 59–65 (1995), the molecular weight of olefin polymers or copolymers becomes extremely lower by elevating the polymerization temperature up to a practical polymerization temperature. Accordingly, there is a limit for obtaining high molecular weight olefin polymers or copolymers only by increasing the monomer concentration, and it was difficult to obtain high molecular weight olefin polymers or copolymers aimed at especially in the case of using a metallocene compound having a simple structure. Hence, there is a demand for developing a means for increasing the molecular weight without such problem.

In general, crystalline propylene polymers are relatively cheap and possess excellent mechanical properties so that they are employed for manufacturing various moldings such as injection moldings.

According to the intended various concrete applications, however, the resultant polymer is sometimes insufficient in mechanical properties, especially rigidity and heat-resisting property so that there is a limitation in spreading concrete applications of the polymer.

Hence, there is a desire from the past for enhancing rigidity and heat-resisting property of moldings made of crystalline propylene polymers.

With respect to films as moldings, those disclosed in EP 0629631, Japanese Laid-open Patent Appln. No. Hei. 7-149833 and Japanese Laid-open Patent Appln. No. Hei. 8-73532 can be mentioned as examples of applications of isotactic polypropylene obtained by the aid of a metallocene catalyst system. In these examples, copolymerization is carried out to realize high transparency as one of the requisites of films.

Among a wide versatility of applications of polypropylene, a polypropylene composition excellent in rigidity, heat-resisting property and transparency is firstly demanded. For this purpose, a variety of nucleating agents are employed to improve rigidity and heat-resisting property of crystalline propylene polymers.

On the other hand, in Japanese Laid-open Patent Appln. No. Hei. 5-9225 and Japanese Laid-open Patent Appln. No. Hei. 5-32723 a resin of polypropylene type containing a propylene polymer is proposed wherein the position of a main elution peak ($T_{max}$) according to the temperature rising elution chromatography is 117.0° C. or at least 118.0° C. for the purpose of improving rigidity and heat-resisting property. There is also disclosed that the resin may be incorporated at need with a nucleating agent.

In Japanese Laid-open Patent Appln. No. Hei. 7-10932, it is proposed propylene polymers wherein a percentage by weight of propylene polymers capable of being dissolved in o-dichlorobenzene at 120–135° C. is more than the value obtained by the formula:

$$(40-15 \log \text{MFR}) \times 100 \qquad (I)$$

wherein MFR stands for a melt flow rate of the propylene polymers, in case of elevating the temperature of o-dichlorobenzene continuously or stepwise to given temperatures to measure the amount of polypropylene eluted at each temperature, for the purpose of improving rigidity and heat-resisting property.

In the applied field of polypropylene, a modified polypropylene composition is demanded which excels in heat-resisting property and in mold processing in the field of fibers on the basis of a narrow molecular weight distribution.

In WO94/28219, there is disclosed that a homopolypropylene of a low melting point obtained by the aid of a metallocene catalyst system is incorporated with a radical generator and the mixture is kneaded to lower the molecular weight of the polypropylene. However, there is neither description nor suggestion in connection with the merit that a specific polypropylene of the present invention having a high melting point can reduce its molecular weight only without affecting its melting point and molecular weight distribution by incorporating therewith a radical generator and then being kneaded as compared with the case of not being incorporated with the radical generator.

From the past, non-woven fabric made of filaments or fibers of propylene polymers finds a wide applications in various fields including medical and hygienic materials such as operation wear, paper diaper, physiological napkin, etc., industrial materials such as packaging materials, oil adsorbents, etc., taking advantage of their suitable physical properties. Especially, the non-woven fabric is preferably used for medical and hygienic materials.

In general, non-woven fabric of propylene polymers are manufactured by spinning the propylene polymers into filaments, laminating the resultant filaments to form a sheet and thermobonding the sheet. For medial and hygienic applications, especially high flexibility and strong tensile strength are required for the non-woven fabric. In case of non-woven fabric formed by partially thermobonding a fibrous sheet with a hot roll such as a heat-embossing roll, tensile strength of the filaments or fibers would be a key factor deciding tenacity of the non-woven fabic since the non-woven fabric is destroyed by cutting of filaments or fibers between thermobonded points if the thermobonding is effected in a good condition.

On the other hand, if non-woven fabric is treated at a higher temperature or heated for a long period of time to attain good thermobonding, the filaments or fibers in sections other than the thermobonded points would be damaged to deteriorate flexibility of the non-woven fabric. In order to obtain non-woven fabric possessing a high tenacity and flexibility, therefore, the filaments or fibers to be used as a material is required to have a high tensile strength and high thermobonding ability. From the past, it is known that a stretch ratio has to be higher to obtain filaments or fibers of a high tensile strength while a stretch ratio has to be lower to obtain filaments or fibers of high thermobonding ability. However, it was extremely difficult to make these opposite characteristics compatible so that filaments or fibers fully satisfying thermobonding ability are preferentially used. Thus, it is the current status that non-woven fabric commonly satisfying high tensile strength and high thermobonding ability has not as yet been obtained.

Accordingly, it is a subject problem of the present invention to provide non-woven fabric possessing a stronger tensile strength and a higher thermobonding ability as well as filaments or fibers for manufacturing the non-woven fabric.

TECHNICAL PROBLEM OF THE INVENTION

In case copolymerization of monomers is carried out, the melting point of the resultant copolymer is generally depressed so that the resultant film is deteriorated in heat-resisting property and rigidity and is difficult to use in the field where heat-resisting property and rigidity is required. Consequently, polypropylene films are demanded which are excellent in heat-resisting property and rigidity and possess extremely high transparency.

Accordingly, it is an object of the present invention to provide a process for producing high molecular weight olefin polymers or copolymers which enables control of the molecular weight at the time of producing olefin polymers or copolymers by polymerization and adjustment of the molecular weight to a higher molecular weight range by using a specific metallocene catalyst.

It is another object of the present invention to provide novel olefin polymers or copolymers wherein (1) weight average molecular weight (Mw), (2) a ratio of isotactic pentad (mmmm), (3) 2,1- and 1,3-propylene unit content existing in the polymer chain, (4) a ratio of the weight average molecular eight (Mw) to a number average molecular weight (Mn), i.e. (Mw/Mn), and (5) in case of elevating the temperature of o-dichlorobenzene continuously or stepwise up to given temperatures to measure the amount of eluated polypropylene at each temperature, the position of a main elution peak, the amount of components existing in the range of ±10° C. of the main elution peak, and a ratio of the total amounts of components eluated at a temperature higher than 0° C., are defined within specified ranges.

It is further object of the present invention to provide injection moldings excellent in rigidity and heat-resisting property made of polypropylene as a resin material among the aforesaid olefin polymers.

It is still further object of the present invention to provide films excellent in rigidity, heat-resisting property and transparency made of polypropylene as a resin material among the aforesaid olefin polymers.

It is still further object of the present invention to provide a polypropylene composition excellent in rigidity, heat-resisting property and transparency wherein the aforesaid polypropylene has been incorporated with an α-form nucleating agent.

It is still further object of the present invention to provide a polypropylene composition excellent in moldability wherein the aforesaid polypropylene has been incorporated with a radical generator and then the mixture as a main component has been subjected to a melt-kneading treatment to have a narrow molecular weight distribution.

It is still further object of the present invention to provide non-woven fabric excellent in tensile strength and flexibility from filaments or fibers of the aforesaid polypropylene.

DISCLOSURE OF THE INVENTION

The present invention has been proposed to achieve the foregoing objects, and more precisely, an important technical feature of the present invention resides in polymerization of olefins by the aid of a specific metallocene catalyst system and in discovery of suitable applications of the resultant polymers.

According to the present invention, there is provided a process for producing high molecular weight olefin polymers or copolymers at a polymerization temperature within the range of 40–90° C. by the aid of a catalyst system comprised predominantly of the following compounds (A), (B) and (C), which comprises polymerizing olefin monomers by the aid of a catalyst system comprised of the compounds (A), (B) and (C) conjointly with an organoaluminum compound (D) whereby the polymerization time or an average retention time in a polymerization reactor is selected within the range of 1–20 hours to make a weight average molecular weight of the resultant olefin polymers or copolymers obtained by gel permeation chromatography adjustable within the range of 30,000–10,000,000 at need: the compound (A) being a transition metal compound of the general formula:

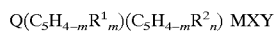

wherein $(C_5H_{4-m}R^1_m)(C_5H_{4-n}R^2_n)$ each stand for a substituted cyclopentadienyl group, m and n each stands for an integer of 1–3, $R^1$ and $R^2$ may be the same or different and each stands for a hydrocarbon group with 1–20 carbon atoms, a silicon-containing hydrocarbon group, and a hydrocarbon group forming at least one hydrocarbon ring which may be substituted by hydrocarbon groups connected to two carbon atoms on the cyclopentadienyl ring, with the proviso that a symmetrical plane containing M is not existent in the position on the cyclopentadienyl ring of $R^1$ and $R^2$ and that $R^1$ or $R^2$ is existent in at least one carbon atom adjacent to the carbon atom connected to Q in at least one cyclopentadienyl ring, Q stands for. a bivalent hydrocarbon radical, unsubstituted silylene radical or a hydrocarbon-substituted silylene radical bridging the groups $(C_6H_{4-m}R^1_m)$ and $(C_6H_{4-n}R^2_n)$, M stands for a transition metal Ti, Zr or Hf, and X and Y may be the same or different and each stands for a hydrogen atom, a halogen atom or a hydrocarbon group, the compound (B) being an aluminoxane, and the compound (C) being a finely particulate carrier.

According to the present invention, there is also provided a process for producing the aforesaid olefin polymers or copolymers wherein the polymerization time or an average retention time in a polymerization reactor is within the range of 2–12 hours.

According to the present invention, there is further provided a process for producing the aforesaid olefin polymers or copolymers wherein the compound (D) is used in a molar ratio within the range of 1–10,000 moles per mole of the transition metal of the compound (A).

According to the present invention, there is still further provided a process for producing the aforesaid olefin polymers or copolymers wherein the compound (D) is used in a molar ratio within the range of 50–2,000 moles per mole of the transition metal of the compound (A).

According to the present invention, there is still further provided a process for producing the aforesaid olefin polymers or copolymers wherein the compound (D) is selected from triethylaluminum, triisobutylaluminum or a mixture of both in a mixing ratio of 10:90 to 90:10.

According to the present invention, there is still further provided a process for producing the aforesaid olefin polymers or copolymers wherein the compound (A) is dimethylsilylene(2,3,5-trimethylcyclopentadienyl) (2',4',5'-trimethylcyclopentadienyl)zirconium dichloride.

According to the present invention, there is still further provided olefin polymers or copolymers wherein:

(1) a weight average molecular weight (Mw) is 30,000–1,000,000, (2) a ratio of isotactic pentad is 0.900–0.949, (3) the 2,1- and 1,3-propylene unit in the polymer chain is 0–1 mole %, (4) a ratio of a weight average molecular weight (Mw) to a number average molecular weight (Mn), i.e. (Mw)/(Mn) is 1.5–3.8, and (5) in case of elevating the temperature of o-dichlorobenzene continuously or stepwise up to given temperatures to measure the amount of eluated polyolefin at each temperature, the position of a main elution peak is at least 95° C. and the amount of components existing in the range of ±10° C. of the main elution peak is at least 90% of the total amounts of components eluated at a temperature higher than 0° C.

According to the present invention, there is still further provided the aforesaid olefin polymers or copolymers wherein the amount of components existing in the range of ±10° C. is at least 95% of the total amounts of components dissolved at a temperature higher than 0° C.

According to the present invention, there is still further provided the aforesaid olefin polymers or copolymers wherein the melting point of the polymers or copolymers is 147–160° C.

According to the present invention, there is still further provided the aforesaid olefin polymers or copolymers wherein an isolation rate of the polymer or copolymer with n-heptane is 0–10%.

According to the present invention, there is still further provided the aforesaid olefin polymers or copolymers wherein the polymer is a homopolymer of propylene, a propylene-olefin random copolymer containing at least 50% by weight of propylene units or a propylene-olefin block copolymer.

According to the present invention, there is still further provided the aforesaid polypropylene produced by the aid of a catalyst system comprised predominantly of the following compounds (A), (B), (C) and (D):

the compound (A) being a transition metal compound of the general formula:

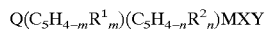

wherein $(C_5H_{4-m}R^1_m)$ and $(C_5H_{4-n}R^2_n)$ each stand for a substituted cyclopentadienyl group, m and n each stands for an integer of 1–3, $R^1$ and $R^2$ may be the same or different and each stands for a hydrocarbon group with 1–20 carbon atoms, a silicon-containing hydrocarbon group, with the proviso that a symmetrical plane containing M is not existent in the position on the cyclopentadienyl ring of $R^1$ and $R^2$ and that $R^1$ or $R^2$ is existent in at least one carbon atom adjacent to the carbon atom connected to Q in at least one cyclopentadienyl ring, Q stands for a bivalent hydrocarbon radical, unsubstituted silylene radical or a hydrocarbon-substituted silylene radical bridging the groups $(C_5H_{4-m}R^1_m)$ and $(C_5H_{4-n}R^2_n)$ M stands for a transition metal Ti, Zr or Hf, and k and Y may be the same or different and each stands for a hydrogen atom, a halogen atom or a hydrocarbon group, the compound (B) being an aluminoxane, the compound (C) being a finely particulate carrier, and the compound (D) an organoaluminum compound.

According to the present invention, there is still further provided the aforesaid polypropylene wherein the compound (A) is dimethylsilylene(2,3,5-trimethylcyclopentadienyl) (2',4',5'-trimethylcyclopentadienyl)zirconium dichloride.

According to the present invention, there is still further provided moldings manufactured from the aforesaid polypropylene.

According to the present invention, there is still further provided the aforesaid polypropylene wherein (1) a ratio of isotactic pentad (mmmm) is 0.900–0.949,
(2) the 2,1- and 1,3-propylene units in the polymer chain is 0–1 mole %,
(3) a weight average molecular weight (Mw) is 40,000–1,000,000,
(4) a ratio of a weight average molecular weight (Mw) to a number average molecular weight (Mn), i.e. (Mw)/(Mn) is 1.5–3.8, and
(5) in case of elevating the temperature of o-dichlorobenzene continuously or stepwise up to given temperatures to measure the amount of eluated polypropylene at each temperature, the position of a main elution peak is at least 95° C. and the amount of components existing in the range of ±10° C. of the main elution peak at least 90% of the total amounts of components eluated at a temperature higher than 0° C.

According to the present invention, there is still further provided the aforesaid polypropylene wherein the melting point is 147–160° C.

According to the present invention, there is still further provided the aforesaid polypropylene wherein an isolation rate of the polymer with n-heptane is 0–10%.

According to the present invention, there is still further provided injection moldings of polypropylene manufactured from the aforesaid polypropylene.

According to the present invention, there is still further provided polypropylene films manufactured from the aforesaid polypropylene.

According to the present invention, there is still further provided a polypropylene composition wherein the aforesaid polyprolylene in an amount of 100 parts by weight is incorporated with 0.0001–1 part by weight of an α-form nucleating agent.

According to the present invention, there is still further provided the aforesaid polypropylene composition wherein the α-form nucleating agent is at least one selected from the group consisting of talc, a metal salt of an aromatic carboxylic acid, a dibenzylidenesorbitol compound, a metal salt of an aromatic phosphoric acid, poly(3-methyl-1-butene), polyvinylcyclohexane and polyallyltrimethylsilane.

According to the present invention, there is still further provided a modified polypropylene composition wherein the aforesaid polypropylene in an amount of 100 parts by weight has been incorporated with a radical generator in an amount of 0.001–0.5 parts by weight and then the mixture as a main component has been subjected to a melt-kneading treatment.

According to the present invention, there is still further provided polypropylene filaments or fibers having an elongation of at least 200% molded from the aforesaid polypropylene.

According to the present invention, there is still further provided non-woven fabric made of the aforesaid polypropylene filaments or fibers.

BRIEF DESCRIPTION OF THE INVENTION

DETAILED EMBODIMENT OF THE INVENTION

Figure 1:
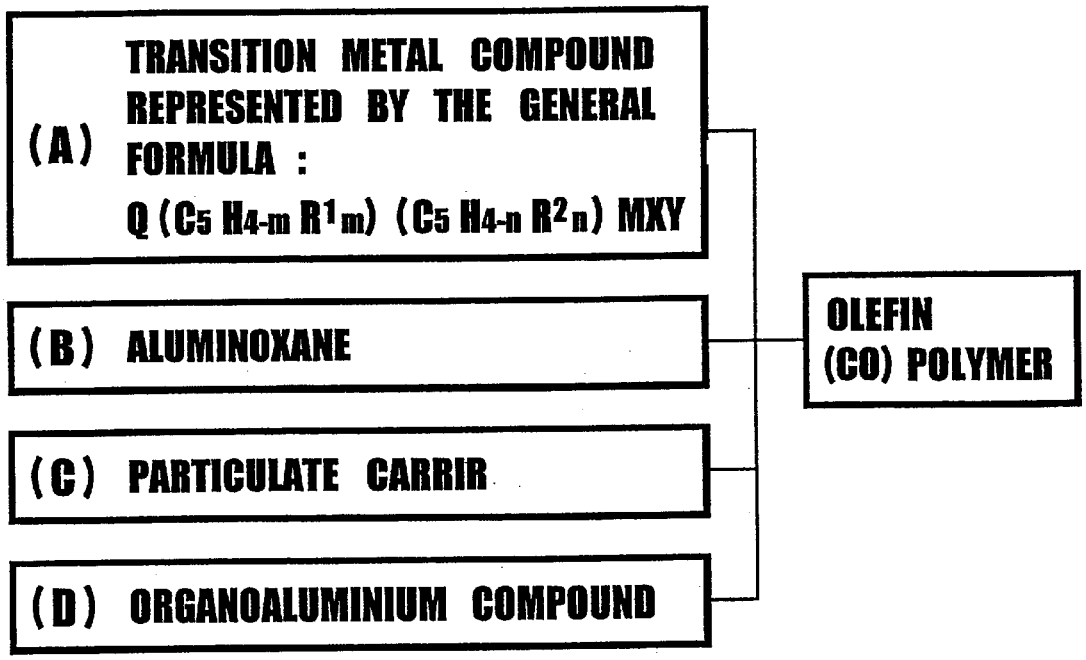
FIG. 1 is a flow sheet showing a process for producing propylene copolymers.
Figure 2:
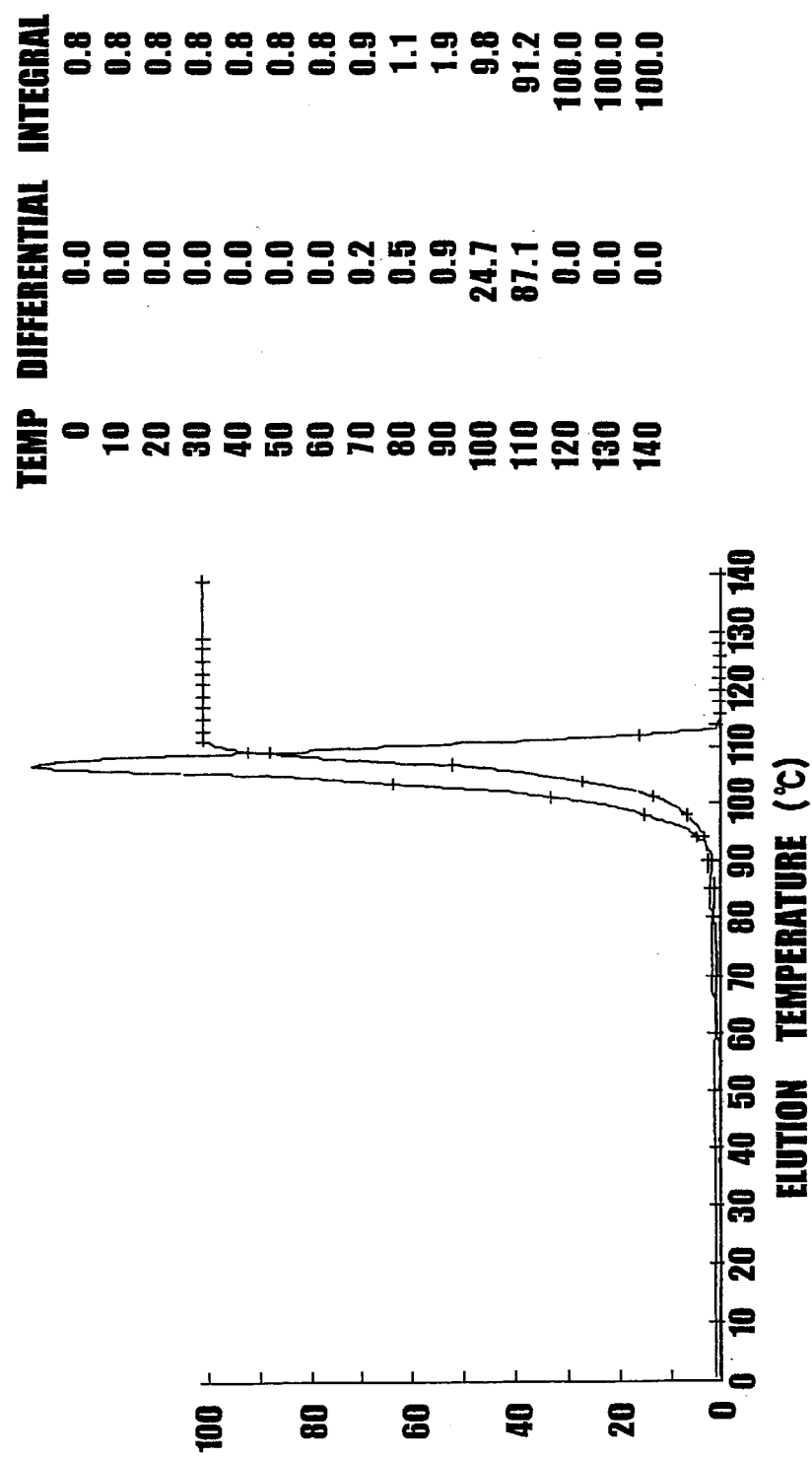
FIG. 2 is an analysis chart (1) according to the temperature rising elution chromatography in Example 9.
Figure 3:
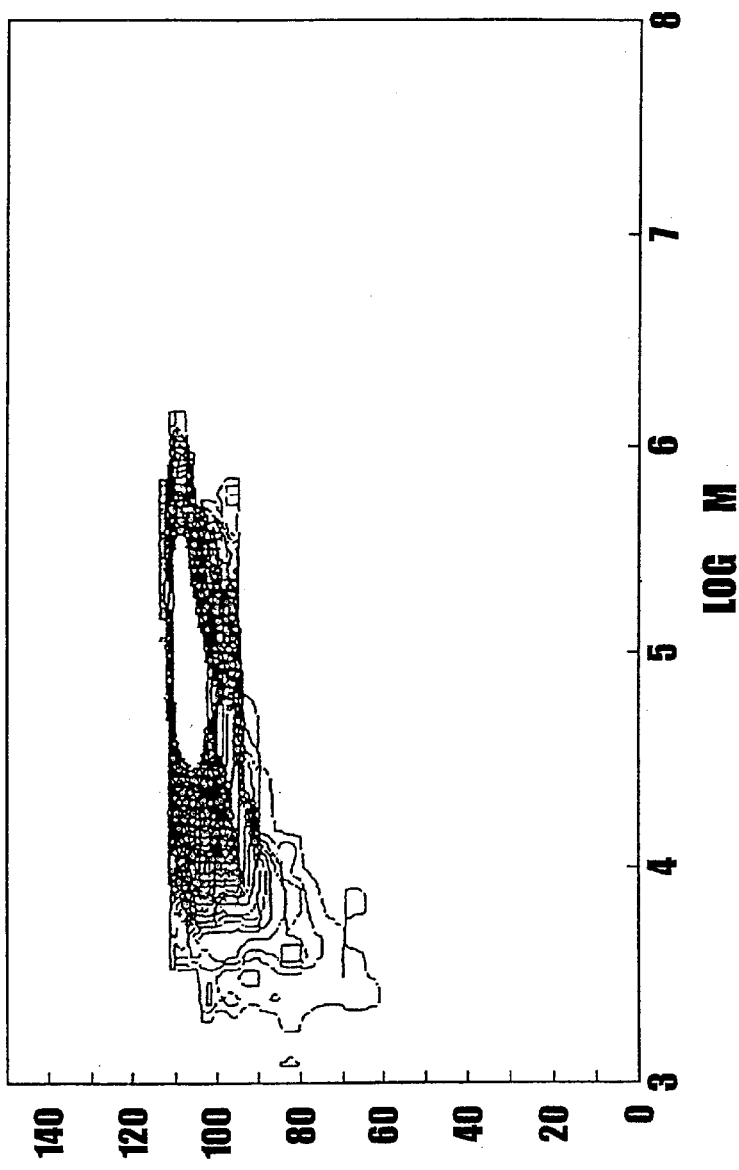
FIG. 3 is an analysis chart (2) according to the temperature rising elution chromatography in Example 9.
Figure 4:
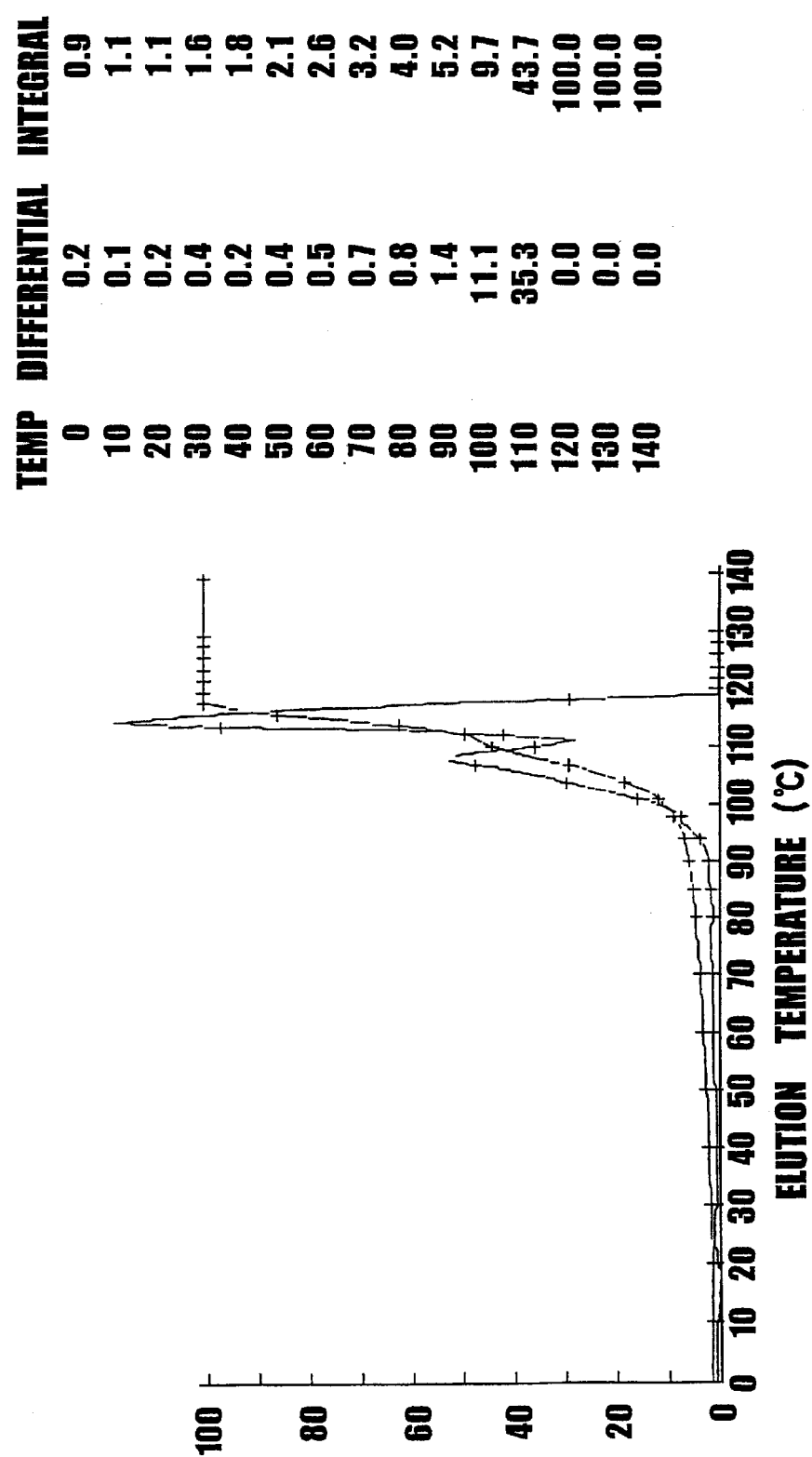
FIG. 4 is an analysis chart (1) according to the temperature rising elution chromatography in Comparative Example 1.
Figure 5:
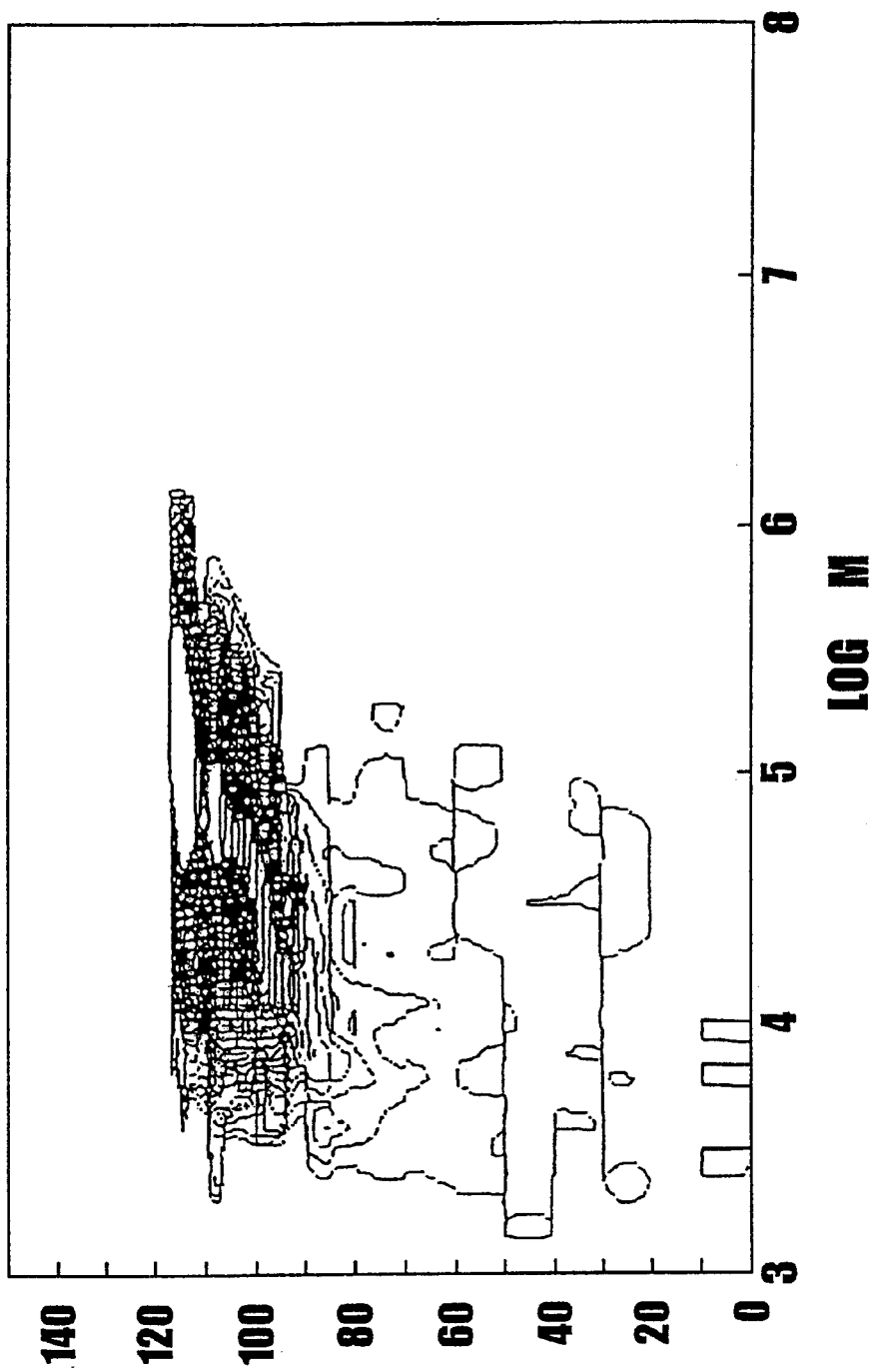
FIG. 5 is an analysis chart (2) according to the temperature rising elution chromatography in Comparative Example 1.
Figure 6:
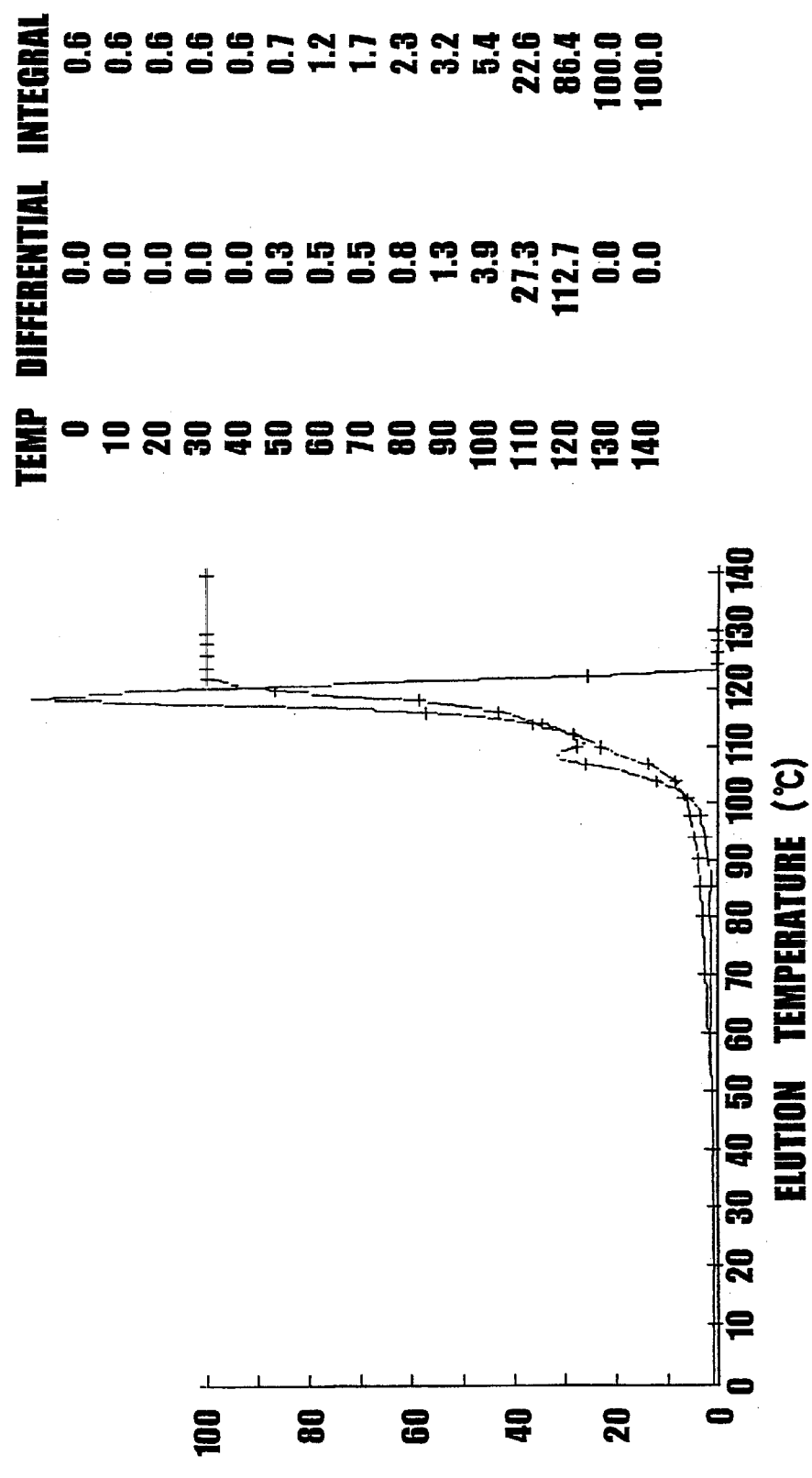
FIG. 6 is an analysis chart (1) according to the temperature rising elution chromatography in Comparative Example 2.
Figure 7:
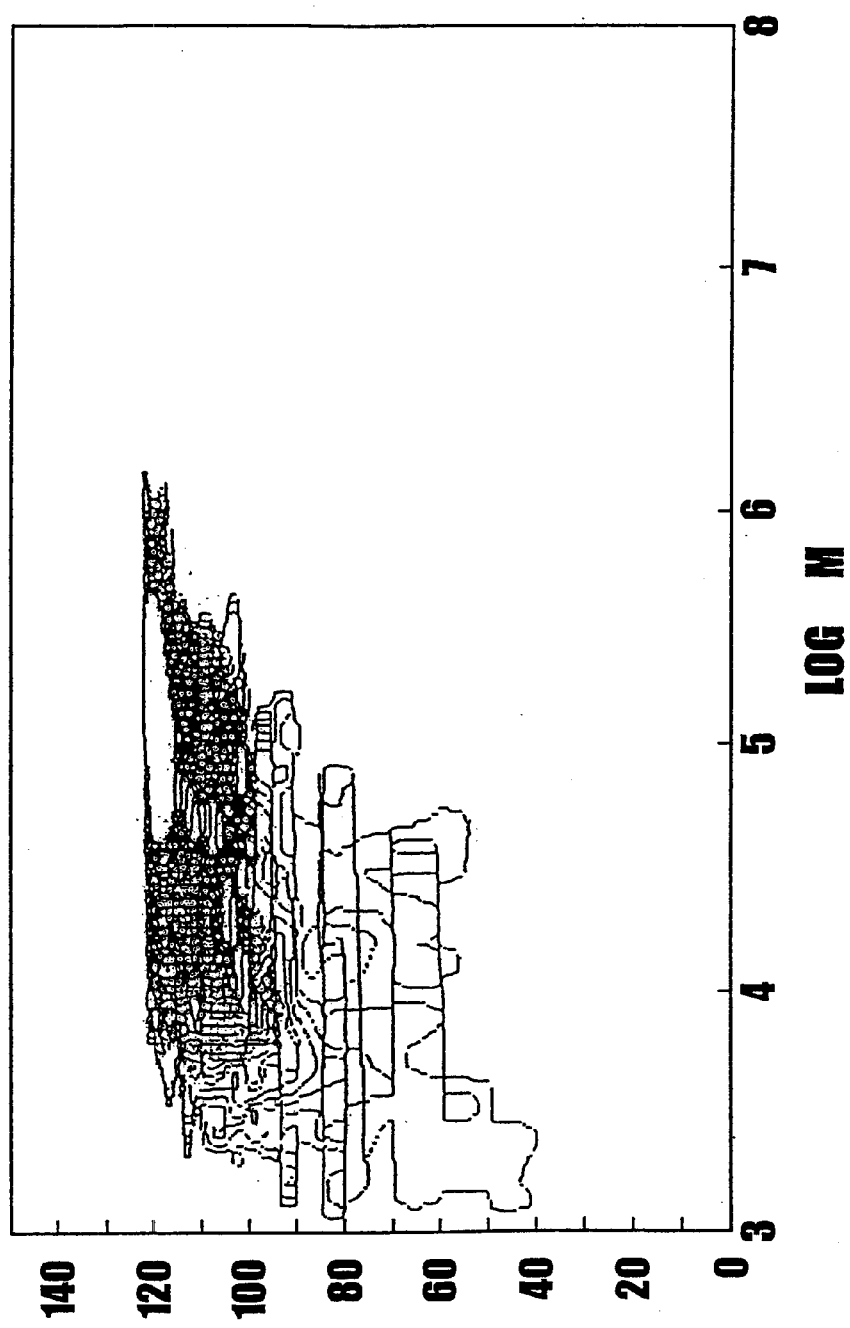
FIG. 7 is an analysis chart (2) according to the temperature rising elution chromatography in Comparative Example 2.

In the present invention, a catalyst system comprised predominantly of the following compounds (A), (B), (C) and (D) is composed of a carrier type solid catalyst system comprise predominantly of the compounds (A), (B) and (C) and a compound (D) which is separately added to the reaction system as a scavenger at the time of polymerization: the compound (A) being a transition metal compound of the general formula:

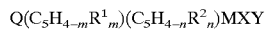

$$Q(C_5H_{4-m}R^1_m)(C_5H_{4-n}R^2_n)MXY$$

wherein $(C_5H_{4-m}R^1_m)$ and $(C_5H_{4-n}R^2_n)$ each stand for a substituted cyclopentadienyl group, m and n each stands for an integer of 1–3, $R^1$ and $R^2$ may be the same or different and each stands for a hydrocarbon group with 1–20 carbon atoms, a silicon-containing hydrocarbon group, and a hydrocarbon group forming at least one hydrocarbon ring which may be substituted by hydrocarbon groups connected to two carbon atoms on the cyclopentadienyl ring, with the proviso that a symmetrical plane containing M is not existent in the position on the cyclopentadienyl ring of $R^1$ and $R^2$ and that $R^1$ or $R^2$ is existent in at least one carbon atom adjacent to the carbon atom connected to, Q in at least one cyclopentadienyl ring, Q stands for a bivalent hydrocarbon radical, unsubstituted silylene radical or a hydrocarbon-substituted silylene radical bridging the groups $(C_5H_{4-m}R^1_m)$ and $(C_5H_{4-n}R^2_n)$ M stands for a transition metal Ti, Zr or Hf, and X and Y may be the same or different and each stands for a hydrogen atom, a halogen atom or a hydrocarbon group, the compound (B) being an aluminoxane, the compound (C) being a fine particulate carrier, and the compound (D) being an organoaluminum compound.

Examples of the compound (A) include any of the compounds within the above mentioned scope. Illustrative of the preferred compound (A) are, for example, dimethylsilylene (2,3,5-trimethylcyclopentadienyl) (2',4',5'-trimethylcyclopentadienyl)titanium dichloride, dimethylsilylene(2,3,5-trimethylcyclopentadienyl) (2',4',5'-trimethylcyclopentadienyl)zirconium dichloride, dimethylsilylene(2,3,5-trimethylcyclopentadienyl) (2',4',5'-trimethylcyclopentadienyl)zirconium dimethyl, dimethylsilylene(2,3,5-trimethylcyclopentadienyl) (2',4',5'-trimethylcyclopentadienyl)hafnium dichloride, dimethylsilylene(2,3,5-trimethylcyclopentadienyl) (2',4',5'-trlmethylcyclopentadienyl)hafnium dimethyl, dimethylsilylene-bis(2-methyl-4-phenylindenyl)zirconium dichloride, dimethylsilylene-bis(2-ethyl-4-phenylindenyl)zirconium dichloride, and dimethylsilylene-bis(2-methyl-4,5-benzoindenyl)zirconium dichloride. Among these compounds, cyclopentadienyl compounds are preferable, above all, dimethylsilylene(2,3,5-trimethylcyclopentadienyl) (2',4',5'-trimethylcyclopentadienyl)zirconium dichloride is more preferable.

The aluminoxane of the compound (B) means an organoaluminum compound of the following general formula [1] or [2]:

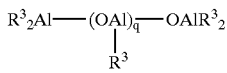   [1]

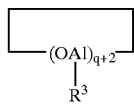   [2]

In these formulas, $R^3$ stands for a hydrocarbon group with 1–6, preferably 1–4 carbon atoms. more particularly, an alkyl group such as methyl, ethyl, propyl, butyl, isobutyl, pentyl or hexyl group; an alkenyl group such as allyl, 2-methylallyl, propenyl, isopropenyl, 2-methyl-1-propenyl or butenyl group; a cycloalkyl group such as cyclopropyl, cyclobutyl, cyclopentyl or cyclohexyl group; and an aryl group. Among these groups, an alkyl group is especially preferable. Each of $R^3$ groups may be the same or different. The notation q stands for an integer of 4–30, preferably 6–30, more preferably 8–30.

The aforesaid alumioxane can be prepared in any of the known methods under various conditions. More particularly, the following methods can be illustrated:

(1) A method wherein a trialkylaluminum is reacted directly with water, using an organic solvent such as toluene or ether,
(2) A method wherein a trialkylaluminum is reacted with a salt containing water of crystallization, for example, cupric sulfate hydrate, aluminum sulfate hydrate, etc.,
(3) A method wherein a trialkylaluminum is reacted with silica gel impregnated with water,
(4) A method wherein trimethylaluminum is mixed with triisobutylaluminum and the mixture is reacted directly with water, using an organic solvent such as toluene or ether,
(5) A method wherein trimethylaluminum is mixed with triisobutylaluminum and the mixture is reacted with a salt containing water of crystallization, for example, cupric sulfate hydrate or aluminum sulfate hydrate, and
(6) A method wherein silica gel or the like is impregnated with water, then reacted with triisobutylaluminum, and thereafter with trimethylaluminum.

Inorganic or organic supports which are granular or spherical particulate solids having a particle diameter of 1–500 µm, preferably 5–300 µm, are used as the particulate carrier of the compound (C).

An oxide is preferably used as the aforesaid finely particulate inorganic carrier. More particularly, illustrative are, for example, $SiO_2$, $Al_2O_3$, MgO, $ZrO_2$, $TiO_2$ and a mixture of these oxides. Among these oxides, a carrier containing as a main ingredient at least one selected from the group consisting of $SiO_2$, $Al_2O_3$ and MgO is preferable. These inorganic oxide carriers are usually employed after they are baked for 1–40 hours at 100–1000° C. Instead of baking, a chemical dehydrating method using, for example, $SiCl_4$, chlorosilane, etc. may be employed. Above all, illustrative of the inorganic compound utilizable as carrier are $SiO_2$, $Al_2O_3$, $TiO_2$, ZnO, etc. or a mixture of these, for example, $SiO_2$—$Al_2O_3$, $SiO_2$—MgO, $SiO_2$—$TiO_2$, $SiO_2$—$Al_2O_3$—MgO, etc. Among these, carriers chiefly containing $SiO_2$ or $Al_2O_3$ are preferable. Further, examples of the finely particulate organic carrier include finely particulate organic polymers, for example, finely particulate polyolefin such as polyethylene, polypropylene, poly-1-butene, and poly-4-methyl-1-pentene and finely particulate polymers such as polystyrene.

The carrier type catalyst component comprising the compounds (A), (B) and (C) can be obtained by reacting the compound (A) with the compound (B) in the presence of the compound (C). Hydrocarbon-soluble metallocene compound and aluminoxane are usually converted into the desired supported catalyst by depositing the metallocene compound and the aluminoxane on a dehydrated carrier. The order of adding the metallocene compound and the aluminoxane may freely be changed. For example, the metallocene compound dissolved in an adequate hydrocarbon solvent can initially be added to the carrier and then the aluminoxane can be added thereto.

Alternatively, the aluminoxane and the metallocene compound are previously reacted together and then added to the carrier at the same time. It is also possible to add the aluminoxane initially to the carrier and then add the metallocene compound thereto. The temperature of the reaction is usually –20–100° C., preferably 0–100° C. while the time required for the reaction is usually at least one minute, preferably within the range of 1–200 minutes. The supported catalyst can be used at need after preliminary polymerization with a small amount of an olefin.

Examples of an olefin used for the preliminary polymerization include ethylene, propylene, 1-butene, 1-hexene, 3-methyl-1-butene, 4-methyl-1-pentene, etc. At least two of these monomers may be copolymerized.

Illustrative of the organoaluminum compound belonging to the compound (D) used as scavenger are, for example, trialkyluminums such as trimethylaluminum, triethylaluminum, triisopropylaluminum, triisobutylaluminum and tri-n-butylaluminum; dialkylaluminum halides such as dimethylaluminum chloride, dimethylaluminum bromide, diethylaluminum chloride and dilsopropylaluminum chloride; and alkylaluminum sesquihalides such as methylaluminum sesquichloride, ethylaluminum sesquichloride, ethylaluminum sesquibromide and isopropylaluminum sesquichloride. Most preferable are triethylaluminum and triisobutylaluminum. It is also possible to use at least two of these organoaluminum compounds together.

Any of the known polymerization process for polymers or copolymers of propylene is applicable to a process for producing polymers or copolymers of propylene which are representative of polymers or copolymers of olefins of the present invention. Thus, a variety of polymerization processes can be employed such as a slurry polymerization process wherein propylene is polymerized or copolymerized in an inert solvent, for example, an aliphatic hydrocarbon such as butane, pentane, hexane, heptane or isooctane; a alicyclic hydrocarbon such as cyclopentane, cyclohexane or methylcyclohexane; an aromatic hydrocarbon such as toluene, xylene or ethylbenzene; gasoline fractions or a hydrogenated diesel oil, a bulk polymerization process wherein propylene monomer per se is used as a solvent, a vapor phase polymerization process wherein polymerization of propylene is carried out in a vapor phase, a solution polymerization process wherein the resultant polymer or copolymer of propylene formed by polymerization is liquid, or a polymerization process wherein at least two of these polymerization processes are combined.

A polymerization condition similar to that used for polymerization or copolymerization of olefins by the aid of a known Ziegler catalyst system can be adopted, which includes a polymerization temperature of 40–90° C., preferably 45–80° C., and a polymerization pressure of atmospheric pressure to 7 MPa, preferably 0.2–5 MPa. In addition, regulation of the molecular weight of polymers or copolymers of propylene is attained by suitably selecting the above polymerization condition or by introducing a molecular weight regulator such as hydrogen into the reaction system.

No limitation exists in the sort of olefins constituting polymers or copolymers of olefins utilizable in the present invention. Olefins with 2–12 carbon atoms are preferably used. More particularly, examples of the olefin include ethylene, propylene, 1-butene, 1-pentene, 1-hexene, 1-octene, 1-decene, 4-methyl-1-pentene, 3-methyl-1-pentene, etc. Among these, propylene is especially preferable as monomer. These olefins may be not only singular but also at least two, or optionally may be copolymerized with a small amount of an α,ω-diene such as 1,5-hexadiene or 1,9-decadiene. Concrete examples of polymers or copolymers of olefins containing propylene as a main unit which are the most preferable embodiment of the present invention include propylene homopolymer and a propylene-olefin random copolymer or a propylene-olefin block copolymer which commonly contain at least 50% by weight of propylene polymer unit. As an olefin in this case, ethylene or 1-butene is most preferably employed and one or both of the monomers may be used together.

A first method for regulating the molecular weight in the present invention is a process for producing polymers or copolymers of olefins wherein the molecular weight of polymers or copolymers to be obtained is controlled to a desired value. This process is characterized by effecting the polymerization in the presence of a specific catalyst system comprised predominantly of the compounds (A), (B), (C) and (D) at a polymerization time or an average retention time in the polymerization reactor selected from the time period of 1–20 hours, preferably 1–12 hours, most preferably 2–10 hours. According to the process of the present invention, the molecular weight of polymers or copolymers of olefins to be produced can freely be regulated only by changing the polymerization time irrespective of polymerization pressure or polymerization temperature. An especially remarkable merit is that polymers or copolymers of olefins having higher molecular weights can be obtained simply by prolonging the polymerization time.

A second method for regulating the molecular weight in the present invention is a process for producing polymers or copolymers of olefins wherein the polymerization is carried out by using the catalyst system wherein a molar ratio of the compound (D) to the compound (A) is selected from the range of 1–10000 moles, preferably 50–2000 moles per mole of the transition metal in the compound (A).

According to the method of this invention, the molecular weight of polymers or copolymers of olefins to be obtained can freely be regulated by changing the molar ratio of the compound (D) to the transition metal in the compound (A) irrespective of polymerization pressure and polymerization temperature. In is likewise especially remarkable merits that polymers or copolymers of olefins having higher molecular weights can be obtained by decreasing the molar ratio to such a degree that the catalyst activity is not extremely deteriorated.

The molecular weight of polymers or copolymers of olefins can also freely be regulated by selection of the sort of the compound (D). In this case, polymers or copolymers of olefins having the highest molecular weight are obtained in case of using triisobutylaluminum.

According to the present invention, polymers or copolymers of olefins having a wide molecular weight distribution can be obtained by suitably combining different polymerization conditions. For example, the molecular weight distribution can be spread by a combination of triethylaluminum with triisobutylaluminum can be used as the compound (D). Besides this, the polymerization may be carried out in series and the several methods for regulating the molecular weight of the present invention may separately be applied to each of the polymerization steps to spread the molecular weight distribution.

After completion of the polymerization or copolymerization process for propylene, polymers or copolymers of propylene aimed at in the present invention can be obtained, if necessary, after carrying out a known catalyst-deactivating treatment, a catalyst residue-eliminating step, a drying step, and the like treatments.

Below is an explanation on the polymers or copolymers of olefins of the present invention.

The polymers or copolymers of olefins of the present invention are characterized by:

(1) a weight average molecular weight (Mw) is 30,000–1,000,000, (2) a ratio of isotactic pentad (mmmm) is 0.900–0.949, (3) the 2,1- and 1,3-propylene units in the polymer chain is 0–1 mole %, (4) a ratio of a weight average molecular weight (Mw) to a number average molecular weight (Mn), i.e. (Mw)/(Mn) is 1.5–3.8, and (5) in case of elevating the temperature of o-dichlorobenzene continuously or stepwise up to given temperatures to measure the amount of eluated polyolefin at each temperature, the position of a main elution peak is at least 95° C. and the amount of components existing in the range of ±10° C. of the main elution peak is at least 90% of the total amounts of components eluated at a temperature higher than 0° C.

Among the characteristic factors of polymers or copolymers of olefins according to the present invention, (1) a weight average molecular weight (Mw) and (2) a ratio of a weight average molecular weight (Mw) to a number average molecular weight (Mn), i.e. (Mw)/(Mn) is calculated according to a measuring result of gel permeation chromatography (GPC) in accordance with the following method:

Using a mixed polystyrene gel column (for example, PSKgel GMH6-HT manufactured by Toso Co., Ltd., Japan), an o-dichlorobenzene solution containing a polymer at a concentration of 0.05% by weight is measured at 135° C. A GPC-150 (manufactured by Waters Corp.) is used, for example, as a measuring apparatus.

A weight average molecular weight (Mw) is 30,000–1,000,000, preferably 40,000–1,000,000, and more preferably 10,000 –1,000,000.

A ratio of a weight average molecular weight (Mw) to a number average molecular weight (Mn), i.e. (Mw)/(Mn) is 1.5–3.8.

The characteristic factor (2) is calculated on the basis of a measuring result of $^{13}C$ nuclear magnetic resonance spectra according to the following method: A mixed solution of o-dichlorobenzene and bromobenzene (a mixing ratio of 8/2 by weight) containing a polymer at a concentration of 20% by weight is measured at 67.20 MHz, 130° C. A JEOL-GX270NMR (manufactured by Nihon Electronics Co., Ltd.), for example, is used as a measuring apparatus.

By the term "the ratio of isotactic pentad (mmmm)" is meant an isotactic ratio in terms of pentad unit in the molecular chain of polymers or copolymers of olefins measured by $^{13}C$ nuclear magnetic resonance spectra proposed by A.Zambelli et al. Macromolecules 6, 925 (1973). By the way, the signals in the measurement of $^{13}C$ nuclear magnetic resonance spectra were assigned according to the method proposed in A. Zambelli et al. Macromolecules 8, 687 (1975).

The ratio of isotactic pentad (mmmm) of the characteristic factor (2) is, as referred to above, a rate of 5 consecutive monomeric propylene units in meso-connection existent in the total propylene monomeric units in polymers or copolymers of olefins. Accordingly, the isotactic property is higher as the ratio of isotactic pentad is higher. In polymers or copolymers of olefins in the present invention have a ratio of isotactic pentad (mmmm) is 0.900–0.949, preferably 0.920–0.949, and more preferably 0.30–0.949.

The term "the 2,1- and 1,3-propylene unit in the polymer chain" in the characteristic factor (3) means a rate of the 2,1- and 1,3-propylene units existing in the polymer chain of polymer molecules or copolymer molecules of olefins measured by $^{13}C$ nuclear magnetic resonance spectra in accordance with the method proposed by A. Tsusui, Polymer 30, 1350 (1989).

The 2,1- and 1,3-propylene units in the polymer chain in the characteristic factor (3) is 0–1 mole %, preferably 0.1–0.7 mole %, and more preferably 0.2–0.5 mole %.

It can be confirmed that the primary structure of polymers or copolymers of olefins according to the present invention is extremely highly controlled by the characteristic factors (1) and (2).

Due to the characteristic factors for polymers or copolymers of olefins according to the present invention, especially the characteristic factors (1) and (2), the melting point of polymers or copolymers of olefins of the present invention is 147–160° C., preferably 150–158° C., and more preferably 152–158° C.

By the way, the melting point of the polymers or copolymers is measured by a DSC7 type Differential Scanning Calorimeter (manufactured by Perkin-Elmer Inc.) according to the method wherein a sample of the polymer or copolymer is heated from room temperature at a heat-elevation rate of 30° C./min. up to 230° C., maintained at the same temperature for 10 minutes, then depressed in temperature at a rate of −20° C./min. down to −20° C., maintained at the same temperature for 10 minutes and again heated at a rate of 20° C./min. whereby a temperature showing a peak of melting is determined as melting point.

The characteristic factor (5) is characterized in that in case of elevating the temperature of o-dichlorobenzene continuously or stepwise up to given temperatures to measure the amount of eluated polyolefin, the position of a main elution peak is at least 95° C., more preferably at least 100° C. and the amount of components existing in the range of ±10° C. of the main elution peak is at least 90%, more preferably 95% of the total amounts of components eluated at a temperature higher than 0° C.

A measuring condition for the characteristic factor (5) is as follows:

A tube made of stainless steel having a length of 15 cm and an inner diameter of 0.46 cm is fully filled with glass beads of 0.1 m/mΦ is used as a separation column. This column is maintained at 140° C. A polymer or copolymer is dissolved at about 140° C. in o-dichlorobenzene so that the concentration may become 2 mg/ml to form a solution. 0.5 ml of a test sample of the resultant solution is supplied into the column and kept retrained. The temperature of the column is allowed to depress down to 0° C. at a cooling rate of 1° C./min. whereby the polymer in the test sample is precipitated on the glass beads in the column. While the temperature of the column is maintained at 0° C., o-dichlorobenzene kept at 0° C. is allowed to flow in the column for 2 minutes at a flow rate of 1 ml/min. whereby polymer soluble in the solvent is extracted to form an extract solution.

Next, the molecular weight distribution of polymer in the extract solution is measured by way of an IR-detector (wave length: 3.42 µm). The temperature is then 3 times elevated stepwise by 10° C. at 0–50° C., by 5° C. at 50–90° C. and by 3° C. at 90–140° C., and the above treatment is repeated. The extracted amount of the polymer is measured at each temperature and the weight ratio of each fraction and molecular weight are then measured.

By the term "the position of main elution peak" is meant that in an elution curve showing a relation between elution temperature (° C.) and eluated amount (% by weight), a peak position (temperature) is shown where the eluated amount becomes maximum. The characteristic factor of the present invention that the amount of the components existing in the range of ±10° C. of the main eluated peak is at least 90%, more preferably 95% of the total amounts of components eluated at a temperature higher than 0° C., apparently shows a character that the distribution of crystallinity is narrower. Details of above fractionation is disclosed in Journal of Applied Polymer Science: Applied Polymer Symposium 52, 145–158 (1993) by T. Usami et al.

No limitation exists. in a process for producing polymers or copolymers of olefins according to the present invention so far as the aforesaid characteristic factors are satisfied however, the polymers and copolymers can be produced preferably according to the aforesaid process using a specific metallocene catalyst system.

The injection moldings of the present invention are obtained from the spefific polypropylene according to any of the known injection molding method.

The film of the present invention can be produced from the polymers or copolymers according to any of the known molding methods such as the T-die method or the tubular method. However, the polymer or copolymer composition melt-extruded has to be subjected to a film-forming treatment under the condition that the composition be rapidly cooled below 90° C. as in the case of manufacturing an ordinary polypropylene films. If the composition is rapidly cooled above 90° C., the resultant film will become extremely brittle and will be deteriorated in low temperature heat sealing property.

The polypropylene film of the present invention includes unstretched film manufactured as above and a composite film formed from the unstretched film according to a known method such as extrusion-lamination or another composite film formed from the unstretched film by coextrusion according to a known method such as the T-die method or the inflation method.

No limitation exists in thickness of the polypropylene film, but a thickness of 5–150 µm, preferably 10–90 µm is usually applicable without problems to almost all demands.

Examples of moldings of the present invention include films, sheets, injection moldings, fibers involving filaments, extrusion moldings, blow moldings, etc.

Polymers or copolymers of propylene according to the present invention may be incorporated with various additives such as antioxidants, UV-absorbing agents, antistatics, a nucleating agent, lubricating agents, incombustible agents, antiblocking agents, coloring agents, inorganic or organic fillers, or with various synthetic resins, so far as the object of the present invention is not damaged. Polymers or copolymers of the present invention are usually subjected to melt-kneading and then to cutting to form pelletized chips and are marketed as such for manufacturing various moldings.

[Polypropylene Compositions]

The present inventors have made extensive research to develop a crystalline propylene polymer composition capable of affording moldings improved in rigidity, heat-resisting property and transparency. As the result, it has now been found surprisingly that a crystalline polypropylene composition comprised of a specific polypropylene incorporated with a specific amount of an α-form nucleating agent gives moldings with improved rigidity, heat-resisting property and transparency. The present invention has been accomplished on the basis of the above finding.

An important technical feature of the polypropylene composition of the present invention resides in a combination of a novel polypropylene produced by the aid of a specific metallocene catalyst with the α-form nucleating agent.

The polypropylene composition of the present invention is characterized by incorporating 100 parts by weight of the specific polypropylene with 0.0001–1 part by weight of the α-form nucleating agent.

The specific polypropylene of the present invention is featured by having the following characteristic factors:

(1) a ratio of isotactic pentad (mmmm) is 0.900–0.949, (2) the 2,1- and 1,3-propylene units in the polymer chain is 0–1 mole %, (3) a weight average molecular weight (Mw) is 40,000–1,000,000, (4) a ratio of a weight average molecular weight (Mw) to a number average molecular weight (Mn), i.e. (Mw)/(Mn) is 1.5–3.8, and (5) in case of elevating the temperature of o-dichlorobenzene continuously or stepwise up to given temperatures to measure the amount of eluated polypropylene at each temperature, the position of a main elution peak is at least 95° C. and the amount of components existing in the range of ±10° C. of the main elution peak is at least 90% of the total amounts of components eluated at a temperature higher than 0° C.

The aforesaid polypropylene of the present invention is effectively and extremely reduced in extraction rate with oils so that it is suitably used as a packaging material for food and various other goods or industrial materials.

Illustrative of the α-form nucleating agents are, for example, inorganic substances or compounds such as talc, alum, silica, titanium oxide, calcium oxide, magnesium oxide, carbon black and clay minerals; carboxylic acids excluding aliphatic monocarboxylic acids such as malonic acid, succinic acid, adipic acid, maleic acid, azelaic acid, sebacic acid, dodecanedicarboxylic acid, citric acid, butanetricarboxylic acid, naphthenic acid, cyclopentanecarboxylic acid, 1-methylcyclopentanecarboxylic acid, 2-methylcyclopentanecarboxylic acid, cyclopentenecarboxylic acid, cyclohexanecarboxylic acid, 1-methylcyclohexanecarboxylic acid, 4-methylcyclohexanecarboxylic acid, 3,5-dimethylcyclohexanecarboxylic acid, 4-butylcyclohexanecarboxylic acid, 4-octylcyclohexanecarboxylic acid, cyclohexenecarboxylic acid, 4-cyclohexene-1,2-dicarboxylic acid, benzoic acid, methylbenzoic acid, dimethylbenzoic acid, ethylbenzoic acid, 4-tert-butylbenzoic acid, salicylic acid, phthalic acid, trimellitic acid and pyromellitic acid; salts or basic salts thereof such as lithium, sodium, potassium, magnesium, calcium, strontium, barium, zinc and aluminum salts or basic salts; dibenzylidenesorbitol compounds such as 1.2,3.4-dibenzylidenesorbitol, 1.3-benzylidene-2.4-p-methylbenzylidenesorbitol, 1.3-benzylidene-2.4-p-ethylbenzylidenesorbitol, 1.3-p-methylbenzylidene-2.4-benzylidenesorbitol, 1.3-p-ethyl-benzylidene-2.4-benzylidenesorbitol, 1.3-p-methylbenzylidene-2.4-p-ethylbenzylidenesorbitol, 1.3-p-ethylbenzylidene-2.4-p-methylbenzylidenesorbitol, 1.3,2.4-bis(p-methylbenzylidene)sorbitol, 1.3,2.4-bis(p-ethylbenzylidene)sorbitol, 1.3,2.4-bis(p-n-propylbenzylidene)sorbitol, 1.3,2.4-bis(p-isopropylbenzylidene)sorbitol, 1.3,2.4-bis(p-n-butylbenzylidene)sorbitol, 1.3,2.4-bis(p-sec-butylbenzylidene)sorbitol, 1.3,2.4-bis(p-tert-butylbenzylidene)sorbitol, 1.3-(2',4'-dimethylbenzylidene)-2.4-benzylidenesorbitol, 1.3-benzylidene-2.4-(2',4'-dimethylbenzylidene)sorbitol, 1.3,2.4-bis(3',4'-dimethylbenzylidene)sorbitol, 1.3,2.4-bis(p-methoxybenzylidene)sorbitol, 1.3,2.4-bis(p-ethoxybenzylidene)sorbitol, 1.3-benzylidene-2.4-p-chlorobenzylidenesorbitol, 1.3-p-chlorobenzylidene-2.4-benzylidenesorbitol, 1.3-p-chlorobenzylidene-2.4-p-methylbenzylidenesorbitol, 1.3-p-chlorobenzylidene-2.4-p-ethylbenzylidenesorbitol, 1.3-p-methylbenzylidene-2.4-p-chlorobenzylidenesorbitol, 1.3-p-ethylbenzylidene-2.4-p-chlorobenzylidenesorbitol and 1.3,2.4-bis(p-chlorobenzylidene)sorbitol; arylphosphate compounds such as lithium bis(4-tert-butylphenyl) phosphate, sodium bis(4-tert-butylphenyl) phosphate, lithium bis(4-cumylphenyl) phosphate, sodium bis(4-cumylphenyl) phosphate, potassium bis(4-tert-butylphenyl) phosphate, calcium mono-4-tert-butylphenyl phosphate, calcium bis(4-tert-butylphenyl) phosphate, magnesium mono-4-tert-butylphenyl phosphate, magnesium bis(4-tert-butylphenyl) phosphate, zinc mono(4-tert-butylphenyl) phosphate, zinc bis(4-tert-butylphenyl) phosphate, aluminum dihydroxy-(4-tert-butylphenyl) phosphate, aluminum hydroxy-bis(4-tert-butylphenyl) phosphate, aluminum tris(4-tert-butylphenyl) phosphate, sodium 2,2'-methylene-bis(4,6-di-tert-butylphenyl) phosphate, sodium 2,2'-ethylidene-bis(4,6-di-tert-butylphenyl) phosphate, sodium 2,2'-methylene-bis(4-cumyl-6-tert-butyl-phenyl) phosphate, lithium 2,2'-methylene-bis(4,6-di-tert-butylphenyl) phosphate, lithium 2,2'-ethylidene-bis(4,6-di-tert-butylphenyl) phosphate, lithium 2,2'-methylene-bis(4-isopropyl-6-tert-butylphenyl) phosphate, lithium 2,2'-methylene-bis(4-methyl-6-tert-butylphenyl) phosphate, lithium 2,2'-methylene-bis(4-ethyl-6-tert-butylphenyl) phosphate, sodium 2,2'-butylidene-bis (4,6-di-tert-butylphenyl) phosphate, sodium 2,2'-tert-octylmethylene-bis(4,6-dimethylphenyl) phosphate, sodium 2,2'-tert-octylmethylene-bis(4,6-di-tert-butylphenyl) phosphate, sodium 2,2'-methylene-bis(4-methyl-6-tert-butylphenyl) phosphate, sodium 2,2'-methylene-bis(4-ethyl-6-tert-butylphenyl) phosphate, sodium (4,4'-dimethyl-6,6'-di-tert-butyl-2,2'-biphenyl) phosphate, sodium 2,2'-ethylidene-bis(4-sec-butyl-4-tert-butylphenyl) phosphate, sodium 2,2'-methylene-bis(4,6-dimethylphenyl) phosphate, sodium 2,2'-methylene-bis(4,6-diethylphenyl) phosphate, potassium 2,2'-ethylidene-bis(4,6-di-tert-butylphenyl) phosphate, calcium bis[2,2'-methylene-bis(4,6-di-tert-butylphenyl) phosphate], magnesium bis[2,2'-methylene-bis(4,6-di-tert-butylphenyl) phosphate], zinc bis[2,2'-methylene-bis(4,6-di-tert-butylphenyl) phosphate], aluminum tris[2,2'-methylene-bis(4,6-di-tert-butylphenyl) phosphate], calcium bis[2,2'-methylene-bis(4-methyl-6-tert-butylphenyl) phosphate], calcium bis[2,2'-ethylidene-bis-(4,6-di-tert-butylphenyl) phosphate], Calcium bis[2,2'-thio-bis(4-methyl-6-tert-butylphenyl) phosphate], calcium bis[2,2'-thio-bis(4-ethyl-6-tert-butylphenyl) phosphate], calcium bis [2,2'-thio-bis(4,6-di-tertbutylphenyl) phosphate], magnesium bis[2,2'-thio-bis(4,6-di-tert-butylphenyl) phosphate], magnesium bis[2,2'-thio-bis(4-tert-octylphenyl) phosphate], barium bis[2,2'-methylene-bis(4,6-di-tert-butylphenyl) phosphate], calcium bis[4,4-dimethyl-6,6'-di-tert-butyl-2,2'-biphenyl) phosphate], magnesium bis[2,2'-ethylidene-bis(4,6-di-tert-butylphenyl) phosphate)], barium bis[2,2'-ethylidene-bis(4,6-di-tert-butylphenyl) phosphate], aluminum tris[2,2'-ethylidene-bis(4,6-di-tert-butylphenyl) phosphate], aluminum dihydroxy-2,2'-methylene-bis(4,6-di-tert-butylphenyl) phosphate, aluminum dihydroxy-2,2'-methylene-bis(4-cumyl-6-tert-butylphenyl) phosphate, aluminum hydroxy-bis[2,2'-methylene-bis(4,6-di-tert-butylphnyl) phosphate], aluminum hydroxy-bis[2,2'-methylene-bis(4-cumyl-6-tert-butylphenyl) phosphate], titanium dihydroxy-bis[2,2'-methylene-bis(4,6-di-tert-butylphenyl) phosphate], tin dihydroxy-bis[2,2'-methylene-bis(4,6-di-tert-butylphenyl) phosphate], zirconium oxy-bis [2,2'-methylene-bis-(4,6-di-tert-butylphenyl) phosphate], aluminum dihydroxy-2,2'-methylene-bis(4-methyl-6-tert-butylphenyl) phosphate], aluminum hydroxy-bis[2,2'-methylene-bis(4-methyl-6-tert-butylphenyl) phosphate], aluminum dihydroxy-2,2'-ethylidene-bis-(4,6-di-tert-butylphenyl) phosphate]and, aluminum hydroxy-bis[2,2'-ethylidene-bis(4,6-di-tert-butylphenyl) phosphate]; mixtures of cyclic polyvalent metal aryl phosphate compounds among the aforesaid aryl phosphate compounds with alkali metal salts of aliphatic monocarboxylic acids (e.g. lithium, sodium or potassium salt of acetic acid, lactic acid, propionic acid, acrylic acid, octanoic acid, isooctanoic acid, nonanoic acid, decanoic acid, lauric acid, myristic acid, palmitic acid, stearic acid, oleic acid, linolic acid, linolenic acid, 12-hydroxy-stearic acid, ricinolic acid, behenoic acid, erucic acid, montanoic acid, melissic acid, stearoyliactic acid, β-dodecylmercaptoacetic acid , β-dodecylmercaptopropionic acid, β-N-methyl-N-lauroylaminopropionic acid, etc.) or basic aluminum lithium hydroxy carbonate hydrate; and high molecular compounds such as poly(3-methyl-1-butene), poly(3-methyl-1-pentene), poly(3-ethyl-1-pentene), poly(4-methyl-1-pentene), Poly(4-methyl-1-hexene), Poly(4,4-dimethyl-1-pentene), poly(4,4-dimethyl-1-hexene), poly(4-ethyl-1-hexene), poly(3-ethyl-1-hexene), poly(allylnaphthalene), poly(allylnorborane), atactic polystyrene, syndiotactic polystyrene, poly(dimethylstyrene), poly(vinylnaphthalene) poly(allylbenzene), poly(allyltoluene), poly(vinylcyclopentane), poly(vinylcyclohexane), poly(vinylcycloheptane), Poly(vinyltrimethylsilane) and Poly(allyltrimethylsilane).

Among these compounds or substances, preferable are talc, aluminum hydroxy-bis(4-tert-butylbenzoate), 1.3,2.4-dibenzylidenesorbitol, 1.3,2.4-bis(p-methylbenzylidene)sorbitol, 1.3,2.4-bis(p-ethylbenzylidene)sorbitol, 1.3,2.4-bis-(2',4'-dimethylbenzylidene)sorbitol, 1.3,2.4-bis(3',4'-dimethylbenzylidene)sorbitol, 1.3-p-chlorobenzilidene-2.4-p-methylbenzylidenesorbitol, 1.3,2.4-bis(p-chlorobenzylidene)sorbitol, sodium bis(4-tert-butylphenyl) phosphate, sodium 2,2'-methylene-bis(4,6-di-tert-butylphenyl) phosphate; a mixture of a polyvalent metal cyclic arylphosphate such as calcium 2,2'-methylene-bis(4,6-di-tert-butylphenyl) phosphate, aluminum 2,2'-methylene-bis(4,6-di-tert-butylphenyl) phosphate, aluminum dihydroxy-2,2'-methylene-bis(4,6-di-tert-butylphenyl) phosphate, or aluminum hydroxy-bis[2,2'-methylene-bis(4,6-di-tert-butylphenyl) phosphate] with an alkali metal salt of an aliphatic monocarboxylic acid; and poly(3-methyl-1-butene), polyvinylcyclohexane or polyallyltrimethylsilane.

These α-form nucleating agents may be used singly or in combination of at least two α-form nucleating agents. The proportion of the α-form nucleating agent to polypropylene varies according to rigidity, heat-resisting property and transparency to be demanded, but usually 0.0001–1 part by weight, preferably 0.01–0.5 part by weight and more preferably 0.05–0.3 part by weight per 100 parts by weight of crystalline polypropylene.

The composition of the present invention may be incorporated with various additives usually used for crystalline propylene polymers, for examples the following additives in such an amount that it may not be affected to the object of the present invention: antioxidants of phenol type, thioether type, or phosphorus type, light stabilizers, heavy metal-inactivating agents (metal deactivators), various agents for enhancing transparency, β-form nucleating agents, lubricating agents, antistatic agents, frost-preventing agents, anti-blocking agents, drip-preventing agents, radical-generating agents such as peroxides, combustion-preventing agents, combustion-preventing assistants, pigments, halogen-capturing agents, dispersing agents such as metal soaps, neutralizing agents, inorganic or organic antibacterial agents, inorganic fillers (such as talc, mica, clay, wollastonite, zeolite, kaolin, bentonite, pearlite, diatomaceous earth, asbestos, calcium carbonate, magnesium carbonate, aluminum hydroxide, magnesium carbonate, hydrotalcite, basic aluminum-lithium hydroxycarbonate hydrate, silicon dioxide, titanium dioxide, zinc oxide, magnesium oxide, calcium oxide, zinc sulfide, barium sulfate, magnesium sulfate, calcium silicate, aluminum silicate, glass fibers, potassium titanate, carbon fibers, carbon black, graphite and metal fibers), inorganic fillers or organic fillers (such as wood dust, pulp, regenerated paper, synthetic fibers or natural fibers) surface-treated with coupling agents (such as those of silane type, titanate type, boron type, aluminate type, zircon-aluminate type).

The polypropylene composition of the present invention can be obtained by blending polypropylene utilizable in the present invention with a given amount of the aforesaid α-form nucleating agent and various additives by the aid of an ordinary mixing apparatus such as a henschel mixer (a trade name), a super mixer, a ribbon blender, a Banbury mixer or the like, and kneading and extruding the mixture at a melt-kneading temperature of 170–300° C., preferably 200–270° C. through an ordinary uniaxial or biaxial extruder, roll or the like and pelletizing the extruded material. The resultant composition may be processed by a variety of methods such as injection molding, extrusion molding, blow molding, etc. to form moldings aimed at.

(Modified Polypropylene Composition)

According to the present invention, there is provided a modified polypropylene composition which is more excellent in heat-resisting property and in molding workability in the field of fibers, etc. due to its narrow molecular weight distribution.

In WO 94/28219 Official Gazette, there is disclosed that the molecular weight of polypropylene can be decreased by incorporating homopolypropylene of low melting point produced by the aid of a metallocene catalyst system with a radical generator and then kneading the resultant mixture. However, neither suggestion nor hint is given in this publication that when a specific polypropylene as in the polypropylene of the present invention having a high melting point is incorporated with a radical generator and the mixture is then kneaded, the melting point and the molecular weight distribution of the polypropylene are not changed but the molecular weight alone is decreased as compared with the case of not incorporating a radical generator into the polypropylene.

An important technical feature of the present invention resides in the selection of the aforesaid specific polypropylene and incorporation of a radical generator thereinto followed by kneading.

According to the present invention, a modified polypropylene composition excellent in moldability due to its narrow molecular weight distribution is obtained by incorporating 100 parts by weight of the aforesaid specific polypropylene with 0.001–0.5 part by weight of a radical generator and subjecting the resultant composition to a melt-kneading treatment at 150–300° C.

The radical generator used in the present invention is desirably to have not too low decomposition temperature for obtaining a homogeneous composition, and so it has a temperature of at least 70° C., preferably at least 100° C. for obtaining a half-life of 10 hours. Illustrative of the radical generator are, for example, organic peroxides such as benzoyl peroxide, tert-butyl Peroxide, tert-butyl peracetate, tert-butyl-peroxyisopropyl carbonate, 2,5-dimethyl-2,5-di(benzoylperoxy)hexane, 2,5-dimethyl-2,5-di(benzoylperoxy)hexine-3, tert-butyl-di-peradipate, tert-butylperoxy-3,5,5-trimethylhexanoate, methyl ethyl ketone peroxide, cyclohexanone peroxide, di-tert-butyl peroxide, dicumyl peroxide, 2,5-dimethyl-2,5-di(tert-butylperoxy)hexane, 2,5-dimethyl-2,5-di(tert-butylperoxy)hexine-3, 1,3-bis( tert-butylperoxyisopropyl)benzene, tert-butylcumyl peroxide, 1,1-bis( tert-butylperoxy)-3,3,5-trimethylcyclohexane, 2,2-bis( tert-butylperoxy)butane, p-menthane hydroperoxide, diisopropylbenzene hydroperoxide, cumene hydroperoxide, tert-butyl hydroperoxide, p-cymene hydroperoxide, 1,1,3,3-tetramethylbutyl hydroperoxide, 2,5-dimethyl-2,5-di(hydroperoxy)hexane, trimethylsilylcumyl peroxide, 2,5-dimethyl-2,5-bis(trimethylsilyl-peroxy)hexane 2,5-dimethyl-2,5-bis(trimethylsilylperoxy)hexine-3 and 1,3-bis(trimethylsilylperoxyisopropyl)benzene. Especially preferable are 2,5-dimethyl-2,5-di(tert-butylperoxy)hexane, 2,5-dimethyl-2,5-di( tert-butylperoxy)hexine-3 and 1,3-bis(tert-butylperoxyisopropyl)benzene.

These radical generators may be used singly or in combination of at least two.

A proportion of the radical generator to the polypropylene of the present invention is such that 0.001–0.5, part by weight, preferably 0.01–0.2 part by weight of the radical generator is used per 100 parts by weight of the polypropylene.

In addition to the radical generator, the polypropylene composition may be incorporated with incorporated with antioxidants, UV-protecting agents, antistatic agents, nucleating agents, lubricating agents, incombustible agents, anti-blocking agents, coloring agents, inorganic or organic fillers, or with various synthetic resins so far as the object of the present invention is not damaged. The composition of the present invention are usually subjected to melt-kneading and then to cutting to form pelletized chips and are used for manufacturing various moldings such as injection moldings, extrusion moldings, blow-moldings, etc.

A method for the melt-kneading treatment is carried out at a temperature of 150–300° C., preferably at 180–270° C. by way of various melt-kneading apparatus. If a temperature for the melt-kneading treatment is 1 over them 150° C., a sufficient modification will not be attained. On the other hand, if the temperature exceeds 3000C, deterioration of polypropylene by thermal oxidation will be accelerated to impart distinct coloring to the composition.

(Filaments, Fibers and Non-woven Fabric of Polypropylene)

From the past, it is known that strong filaments or fibers in tensile strength are obtained by increasing stretch ratio while filaments or fibers of high thermobonding ability are obtained by decreasing stretch ratio. However, it was extremely difficult to make both opposite characteristics compatible so that filaments or fibers fully satisfying thermobonding ability are usually and preferentially used. Thus, it is a current status that non-woven fabric satisfying both of high tensile strength and high thermobonding ability has not as yet developed.

Nevertheless, the present invention now provides non-woven fabric possessing both of high tensile strength and high thermobonding ability as well as filaments or fibers used for manufacturing the non-woven fabric.

The polypropylene filaments of the present invention can be produced from the aforesaid polypropylene as material according to the known conventional melt-spinning apparatus and stretching apparatus. Further, it is possible to use the spunbond method or the melt-blow method wherein a stretching treatment is not performed. The polypropylene fibers of the present invention has an elongation of at least 150%, preferably at least 200% and more preferably at least 300%. In case an elongation is large, thermobonding ability becomes better so that non-woven fabric manufactured by processing the filaments with a roll will possess strong tensile strength and high flexibility.

According to the present invention, the aforesaid specific polypropylene is used as resin material for the manufacture of filaments whereby spinning velocity is effectively enhanced and filaments of high fineness can effectively be manufactured.

The polypropylene filaments of the present invention have the characteristic properties, in addition to the above mentioned characteristics, that non-woven fabric of a basis weight of 20 g/m$^2$ made of the polypropylene filaments has a non-woven fabric tenacity of at least 2.5 kg in case of flexibility in lateral direction of the non-woven fabric being 30 mm and has a non-woven fabric flexibility of not more than 25 mm in case of the non-woven fabric tenacity being 1.8 kg.

(Industrial Utifizability)

According to the present invention, the molecular weight of olefin polymers or copolymers can freely be adjusted by a new method wherein the use of a specific metallocene catalyst system, the polymerization time, a molar ratio of the scavenger to the transition metal, and the sort of the scavenger are selected. Furthermore, adjustment of molecular weight towards a high molecular weight side which was quite difficult in the prior art is now possible. It is also possible to broaden the range of molecular weight distribution according to a specific combination of the production process.

The olefin polymers or copolymers of olefins, especially polypropylene involved therein is excellent, in addition to the aforesaid characteristics, in rigidity and heat-resisting property so that films manufactured therefrom is excellent in transparency in addition to the characteristics just above mentioned.

A composition made by incorporating the polypropylene with the α-form nucleating agent is excellent in rigidity, heat-resisting property and transparency and moldings manufactured therefrom according to various molding methods can be used for various industrial parts, containers, films, sheets, and filaments or fibers.

A composition made by incorporating the polypropylene with the radical generator and subjected the mixture to melt-kneading is excellent in heat-resisting property and molding workability in the field of fibers due to its narrow molecular weight distribution. As the physical properties of polypropylene are not changed even in case of using the radical generator for decreasing the molecular weight, the molecular weight of the polypropylene produced by a polymerization facilities can be controlled with the radical generator thereby decreasing transition products in the polymerization facilities.

In addition, filaments or fibers manufactured from the polypropylene as a resin material can be enhanced in elongation. Thus, non-woven fabric made of such filaments or fibers is excellent as the fabric exhibits strong tenacity and high thermobonding ability.

EXAMPLE

The present invention will now be illustrated in more detail by way of Examples and Comparative Examples. The definitions for technical terms and the methods for measurements given in Examples and Comparative Examples are as follows:

(1) MFR: In accordance with JIS K-7210, the value (Unit: g/10 min.) measured under the condition 14 (under the condition of 21.18N load, 230° C.) in Table 1.

(2) Melting point (Tm): Using DSC7 type Differential Scanning Colorimeter (manufactured by Perkin-Elmer), the melting points of polymers and copolymers of olefins were measured according to the method wherein a sample of the polymer or copolymer was heated from room temperature up to 230° C. at a heat-elevation rate of 30° C./min., maintained at the same temperature for 10 minutes, then depressed in temperature down to −20° C. at a rate of −20° C./min., maintained at this temperature for 10 minutes and again heated at a rate of 20° C./min. whereby a temperature showing a peak of melting was determined as melting point.

(3) Crystallizing (Crystallization) temperature (Tc): Using DSC7 type Differential Scanning Colorimeter (manufactured by Perkin-Elmer), the crystallizing temperature of polymers and copolymers of olefins was measured according to the method wherein a sample of the polymer or copolymer was heated from room temperature up to 230° C. at a heat-elevation rate of 30° C./min., maintained at the same temperature for 10 minutes, then depressed in temperature down to −20° C. at a rate of −20° C./min., maintained at the same temperature for 10 minutes and again heated up to 230° C. at a temperature-elevation rate of 20° C./min., maintained at the same temperature for 10 minutes, depressed in temperature down to 150° C. at a rate of −80° C./min., and further depressed in temperature at a rate of −5° C./min. whereby a temperature showing the maximum peak at the time of crystallization was determined as the crystallization temperature (Unit: ° C.).

(4) Molecular weight: Mw, Mn and Mw/Mn were measured by calculation based on the result of the gel permeation chromatography (GPC) according to the following methods: Using an o-dichlorobenzene solution having a polymer concentration of 0.05% by weight and using a mixed polystyrene gel column (for example, PSKgel GMH6-HT marketed by Toso K. K., Japan), the measurement was carried out at 135° C. As the measuring apparatus was used, for example, GPC-150 (Waters Corp.).

(5) Young's modulus (YM; MPa): In accordance with ASTM D882, tensile strength in MD (lengthwise direction) and TD (traverse direction) of a film sample were measured and a lower value of either was determined as Young's modulus of the film.

(6) Flexural modulus (MPa): The value was evaluated according to a bending test. Using pellets of the polymers or copolymers, a test piece of 10 mm in length, 10 mm in width, and 4 mm in thickness was made by way of injection molding and used for a flexural modulus was measured according to JIS K7203.

(7) Haze (%): Using a test piece of 1 mm in thickness, the degree of haze was measured in accordance with the method of JIS K7105. By the way, the test piece was made as in the case of measuring Young's modulus.

(8) HDT (heat deformation temperature): In accordance with the method of JIS K7207, HDT was measured with a load of 0.451 MPa.

(9) Extraction rate with boiling n-heptane: A film of the polymer of 100×100×1 mm was made under non-press condition with a press heated at 200° C. The film was cooled with a cooling press and cut into square chips of 20×20×1 mm. Then, using a pulverizer, chips were pulverized to form powder passing a screen of 500 μm, Using a Soxhlet extractor, 2 g of the powder as sample was extracted with boiling n-heptane for 3 hours. After completion of the extraction, the sample was dried for 2 hour under vacuum at 80° C. A rate of decreasing weight between the sample before the extraction and the sample after the extraction was determined as the extraction rate with boiling n-heptane.

(10) The ratio (mmmm) (the ratio of isotactic pentad in terms of mmmm): The rate was measured according to the method as already described,

(11) Mis-insertion (mole %) (the 2,1- and 1,3-propylene units existing in the polymer chain): This was measured according to the method as already described.

(12) E ±10%: In case of elevating the temperature of o-dichlorobenzene continuously or stepwise up to given temperatures to measure the amount of eluated polypropylene at each temperature, the position of a main elution peak and amount of components existing in the range of ±10° C. of the main elution peak were measured. This was measured according to the method already described.

(13) Filament tenacity (g/d): Using a tension tester, the filament tenacity was measured at an elongation velocity of 100% per minute according to JIS L1015.

(14) Elongation of filament (%): Using a constant velocity elongation type tester, the filament tenacity was measured at an elongation velocity of 100% per minute according to JIS L1015.

(15) Flexibility (mm): The flexibility was measured in accordance with JIS L1018, the item 6.21A.

On a horizontal table (a cantilever type tester) having a slant of 45° on the one side end and having a smooth surface with a scale was placed along the scale a non-woven fabric piece (a test piece) of 15 cm in length and 5 cm in width cut out from the lateral side of a non-woven fabric having a basis weight of 20 g/M$^2$. The test piece of non-woven fabric was moved by manual operation towards the slant and taken out while sliding smoothly on the slant whereby the length of the test piece taken out was recorded in terms of mm when the terminal end of the test piece was brought into contact with the slant. This length value was determined as an index of flexibility. A smaller value means better flexibility of the non-woven fabric.

(16) Tenacity of non-woven fabric (kg): Non-woven fabric of a basis weight of 20 g/m$^2$ was manufactured and a test piece of 15 cm in length and 5 cm in width was cut out from each of the machinery direction and the lateral direction. Using a tensile tester, a tensile strength of the test piece was measured under the condition that a grasping interval of 100 mm and a tensile velocity of 100 mm/min. The tenacity was then calculated by the following formula:

(17) Tenacity of non-woven fabric= √tensile strength in M×tensile strength in T wherein M stands for machinery direction while T for traverse direction.

Example 1

Preparation of Carrier Type Catalyst

In a well dried 500 ml flask the air in which was replaced with $N_2$ were placed 0.39 g 0.889 mmole) of dimethylsilylene(2,3,5-trimethylcyclopentadienyl) (2',4',5'-trimethylcyclopentadienyl)zirconiumn dichloride and 267 mmole of methylaluminoxane diluted with toluene (in terms of Al atom). The mixture is reacted together for 10 minutes. To this reaction mixture was added 10 g of silica (marketed by Grace Davison) baked at 800° C. for 8 hours, and the mixture was stirred for 10 minutes. While making the flask vacuum from the top of the container, a very slight stream of nitrogen was introduced from the bottom. The mixture was then heated at 70° C. while the solvent was allowed to evaporate for a period of 8 hours. The resultant dried solid was cooled at room temperature overnight. In a well dried 500 ml of flask the air in which was replaced with $N_2$ were placed the resultant solid catalyst and 250 ml of isopentane, and the mixture was cooled to 0° C. Ethylene was then added to the flask at a flow rate of 80 ml/min. continuously for 4 hours to effect preliminary polymerization. The supernatant liquid was then removed by decantation and the residue was washed four times with 1000 ml of isopentane by decantation. The residue was dried in vacuo for 2 hours at room temperature to prepare 35 g of a carrier type catalyst. As a result of analysis on the composition of the catalyst, it was found that 1.7% by weight of Zr and 10.7% by weight of Al were contained in the carrier type catalyst.

Production of Polypropylene

In a 1.5 liter autoclave in which the air was sufficiently replaced with nitrogen were placed 800 ml of n-hexane and 0.5 mmole of triethylaluminum, and the mixture was agitated for 3 minutes. The carrier type catalyst (1000 mg) as prepared above was then added to the mixture, and monomeric propylene was continuously supplied to the mixture whereby polymerization was carried out for one hour at 50° C., keeping the pressure constantly under 1.08 MPa. The resultant powder was 15.5 g. On analysis of the resultant polypropylene, it was found that MFR was 93 g/10 min., Mw was 85917 g/mol and Mw/Mn was 2.5.

Example 2

Production of Polypropylene

A polymerization reaction was carried out as in the same manner as described in Example 1 except that the polymerization time was set as 2 hours. The resultant powder was 36.6 g. On analysis of the resultant polypropylene, it was found that MFR was 76 g/10 min, Mw was 91239/g/mole, Mw/Mn was 2.3, a melting point was 155.5° C., and a crystallization temperature was 113.3° C.

Example 3

Production of Polypropylene

A polymerization reaction was carried out as in the same manner as described in Example 1 except that the polymerization time was set as 4 hours. The resultant powder was 69 g. On analysis of the resultant polypropylene, it was found that MFR was 59 g/10 min., Mw was 98382 g/mole, Mw/Mn was 2.2, a melting point was 155.6° C., and a crystallization temperature was 112.6° C.

Example 4

Production of Polypropylene

A polymerization reaction was carried out in the same manner as described in Example 1 except that the polymerization time was set as 6 hours. The resultant powder was 106.5 g. On analysis of the resultant polypropylene, it was found that MFR was 46 g/mole, Mw was 105950 g/mole, Mw/Mn was 2.3, a melting point was 155.4° C., and a crystallization temperature was 113.2° C.

Example 5

Production of Polypropylene

A polymerization reaction was carried out in the same manner as described in Example 1 except that the polymerization time was set as 10 hours. The resultant powder was 166 g. On analysis of the resultant polypropylene, it was found that MFR was 35 g/10 min., Mw was 114930 g/mole, and Mw/Mn was 2.5.

Example 6

Production of Polypropylene

A polymerization reaction was carried out in the same manner as described in Example 5 except that the amount of triethylaluminum added was 0.2 mmole. The resultant powder was 160 g. On analysis of the resultant polypropylene, it was found that MFR was 20 g/10 min., Mw was 135770 g/mole, and Mw/Mn was 2.3.

Example 7

Production of Polypropylene

A polymerization reaction was carried out in the same manner as described in Example 5 except that the amount of triethylaluminum added was 1.0 mmole. The resultant powder was 170 g. On analysis of the resultant polypropylene, it was found that MFR was 60 g/10 min., Mw was 97831 g/mole, and Mw/Mn was 2.3.

Example 8

Production of Polypropylene

A polymerization reaction was carried out in the same manner as described in Example 5 except that triisobutylaluminum was used in place of triethylaluminum. The resultant powder was 255 g. On analysis of the resultant polypropylene, it was found that MFR was 10.0 g/10 min., Mw was 166880 g/mole, and Mw/Mn was 2.4.

Example 9

Production of Polypropylene

In a 630 liter autoclave in which the air was sufficiently replaced with nitrogen are placed 120 liters of n-hexane and 250 mmoles of triethylaluminum, and the mixture was stirred for 5 minutes. To the mixture was then added 25 g of the carrier type catalyst as prepared in Example 1 and the whole was heated to 50° C. After introducing 1.0 mole of gaseous hydrogen into the autoclave, monomeric propylene was continuously supplied to the mixture whereby polymerization was carried out for 10 hours at 50° C. maintaining the pressure constantly under 1.32 MPa. The resultant slurry was separated into a cake and the solvent by way of a centrifugal separator, and the cake was dried to obtain 40 kg of polypropylene. To 100 parts by weight of the resultant polypropylene powder were then added 0.05 part by weight of tetrakis (methylene(3,5-di-tert-butyl-4-hydroxy-hydrocinnamate)) methane, 0.1 part by weight of tris(2,4-di-tert-butylphenyl) phosphate, and 0.1 part by weight of calcium stearate. The mixture was charged into a uniaxial extruding pelletizer having a screw of 40 mm$\phi$ and operated at an extrusion temperature of 190° C. to obtain polypropylene pellets.

On analysis of the resultant polypropylene, it was found that MFR was 56 g/10 min., a melting point was 156.6C, a crystallization temperature was 114.5° C., Mw/Mn was 2.3 and Mw was $1.223 \times 10^5$ g/mole. Further, the ratio of isotactic pentad (mmmm) measured by $^{13}$C nuclear magnetic resonance spectra was 0.941, and the mis-insertion due to 2,1-insertion reaction and 1,3-insertion reaction was 0.43 mole %. In case of elevating the temperature of o-dichlorobenzene continuously or stepwise up to given temperatures to measure the amount of eluated polypropylene, the position of a main elution peak was 108° C. and the amount of components existing in the range of ±10° C. of the main dissolved peak was 97% of the total amount of components eluated at a temperature higher than 0° C. An extraction rate with boiling n-hexane was 1.5%.

Production of a Polypropylene Film

The pellets of polypropylene obtained as above was subjected to a T-die method operated at a melt-extrusion temperature of 190° C., a cooling roll temperature of 30° C. and a line velocity (take-up velocity) of 20 m/min.) whereby a film having a thickness of 20 $\mu$m and 50 )im and a width of 300 mm was manufactured.

Table 1 shows physical properties of the film product measured according to the aforesaid methods.

Production of Injection Moldings of Polypropylene

Using the pelltes obtained as above and an injection molding machine, a test sample of 100×10×4 mm for the measurement of flexural modulus and a test sample of 127×12.7×6.4 mm were injection molded under the condition of a resin temperature of 200° C. and a metal mold temperature of 50° C. A flexural modulus of the resultant moldings was 1460 MPa while an HDT was 123° C.

Example 10

Preparation of a Carrier Type Catalyst

A carrier type catalyst was prepared in the same manner as described in Example 1 except that dimethylsilylene-bis (2-methyl-4,5-benzoindenyl)zirconium dichloride was used as metallocene in place of dimethylsilylene(2,3,5-trimethylcyclopentadienyl) (2',4',5'-trimethylcyclopentadienyl)zirconium dichloride.

Production of Polypropylene

A polymerization reaction was carried out in the same manner as described in Example 9 except that the carrier type catalyst as prepared above was used in place of the carrier type catalyst prepared in Example 1, gaseous hydrogen introduced was 1.1 mole and the polymerization pressure was 1.08 MPa whereby 41 kg of polypropylene was obtained. Pellets of polypropylene were manufactured in the same manner as described in Example 9 and then subjected to analysis whereby it was found that MFR was 79 g/10 min., a melting point was 145.8° C., Mw/Mn was 2.7 and Mw was $1.121 \times 10^5$ g/mole.

Comparative Example 1

Production of Polypropylene

In a 630 liter autoclave the air in which was sufficiently replaced with nitrogen were placed 240 liters of n-hexane and 983 mmoles of diethylaluminum chloride. To this mixture was added 10 g of titanium trichoride catalyst system prepared according to the method as described in Japanes laid-open Patent Appln. No. Sho. 56-110707, and the mixture was heated at 70° C. After introducing gaseous hydrogen of 6.1 moles into the autoclave, a polymerization reaction was carried out by continuously supplying monomeric propylene at 70° C., under a constant pressure of 0.8 MPa for 94 minutes. To the resultant slurry was added 50 liters of methanol and 200 liters of n-hexane, and the mixture was treated for 30 minutes at 85° C.

To the mixture was then added 1.0 liter of a 20% aqueous solution of sodium hydroxide, and the mixture was reacted at 80° C. for 30 minutes. Further 70 liters of pure water was added and the reaction was carried out at 80° C. for 30 minutes and stirring was ceased. After the aqueous phase was separated from the hexane phase, the aqueous phase alone was taken out and 150 liters of pure water was mixed and the mixture was stirred for 20 minutes. The aqueous phase alone was then taken out and subjected to centrifugal separation to separate a cake and the solvent (n-hexane). By drying the cake, 20 kg of polypropylene was obtained, MFR of which was 4.0 g/10 min.

To 100 parts by weight of polypropylene thus obtained were added 0.05 parts by weight of tetrakis (methylene(3, 5-di-teributyl-4-hydroxyl-hydrocinnamate)) methane, 0.1 part by weight of tris(2,4-di-tert-butylphenyl) phosphate, 0.1 part by weight of calcium stearate, and 0.08 part by weight of 1,3-bis(tert-butyl-peroxyisopropyl)benzene, and the mixture was processed by a uniaxial extrusion-pelletizer having a screw of 40 mm$\phi$ operated at an extrusion temperature of 190° C. to obtain polypropylene pellets.

On analysis of the resultant polypropylene, it was found that MFR was 71 g/10 min., a melting point was 158.0° C., a crystallizing temperature was 118.4° C., Mw/Mn was 3.0 and Mw was $1.206 \times 10^5$ g/mole. The ratio of isotactic pentad (mmmm) measured by $^{13}$C nuclear magnetic resonance spectra was 0.941, and the amount of 2,1- and 1,3-propylene unit existing in the polymer chain was below the lower limit (0.02 mole %) of the detectable range of the measurement apparatus used. In case of elevating the temperature of o-dichlorobenzene continuously or stepwise up to given temperatures to measure the amount of eluated polypropylene, the position of a main elution peak was 116° C. and the amount of components existing in the range of ±10° C. of the main elution peak was 82.3% of the total amount of components eluated at a temperature higher than 0° C.

Production of Moldings of Polypropylene

A polypropylene film was manufactured in the same manner as described in Example 9. The physical properties of the resultant film measured according to the aforesaid methods, are given in Table 1.

A bending elasticity of the moldings manufactured according to the method as described in Example 9 was 1310 MPa while HDT was 119.1° C.

Comparative Example 2

Production of Polypropylene

In a 630 liter autoclave the air in which was sufficiently replaced with nitrogen were placed 240 liters of n-hexane and 500 mmoles of triethylaluminum and 200 mmoles of diisopropyldimethoxysilane. To the mixture was added 5 g of a titanium catalyst component carried on magnesium chloride obtained according to the method as described in Example 1 of Japanese Laid-open Patent Appln. No. Sho. 62-104812, and the mixture was heated at 70° C. After introducing 6.0 moles of gaseous hydrogen into the autoclave, a polymerization reaction was carried out by continuously supplying monomeric propylene at 70° C. under a constant pressure of 0.9 MPa for 4 hours. To the resultant slurry were added 50 liters of methanol and 200 liters of N-hexane, and the mixture was treated for 30 minutes at 85° C., To the mixture was then added 0.5 liter of a 20% aqueous solution of sodium hydroxide, and the mixture was treated for 30 minutes at 85° C. To the mixture was further added 100 liter of pure water, and the mixture was reacted for 30 minutes at 80° C. and stirring was ceased. After separation of the aqueous phase from the hexane phase, the aqueous phase alone was taken up, 300 liters of pure water was added further and the mixture was stirred for 20 minutes. The aqueous phase was extracted out, and the hexane phase was separated by way of a centrifugal separator into a cake and the solvent (hexane). By drying the cake, 73 kg of powdery polypropylene was obtained.

The resultant polypropylene has an MFR of 4.0 g/10 min. To 100 part by weight of the powdery polypropylene thus obtained were added 0.05 part by weight of tetrakis (methylene(3,5-di-tert-butyl-4-hydroxyl-hydrocinnamate)) methane, 0.1 part by weight of tris(2,4-di-tert-butylphenyl) phosphite, 0.1 part by weight of calcium stearate and 0.08 part by weight of 1,3-bis(tert-butyl-peroxyisopropyl) benzene, and the mixture was extruded by the aid of a uniaxial extrusion-pelletizer having a screw of 40 mm$\phi$ and operated at an extrusion temperature of 190° C. whereby pellets of polypropylene was obtained.

On analysis of the resultant polypropylene, it was found that MFR was 70 g/10 min., a melting point was 160.6° C., a crystallizing temperature was 106.4° .C, Mw/Mn was 3.2 and Mw was $1.260 \times 10^5$ g/mole. The ratio of isotactic pentad (mmmm) measured by $^{13}$C nuclear magnetic resonance spectra was 0.949, and the amount of 2,1- and 1,3-propylene units existing in the polymer chain was below the lower limit (0.02 mole %) of the detectable range of the measurement apparatus used. In case of elevating the temperature of o-dichlorobenzene continuously or stepwise up to given temperatures to measure the amount of eluated polypropylene, the position of a main elution peak was 118° C. and the amount of components existing in the range of ±10° C. of the main elution peak was 89.2% of the total amount of components eluated at a temperature higher than 0° C.

Production of Moldings of Polypropylene

A polypropylene film was manufactured in the, same manner as described in Example 9. The physical properties of the resultant film measured according to the aforesaid methods are given in Table 1.

A bending elasticity of the moldings manufactured according to the method as described in Example 9 was 1430 MPa while HDT was 117.9° C.

Comparative Example 3

Production of Polypropylene

In a 630 liter autoclave the air in which was sufficiently replaced with nitrogen were placed 120 liters of n-hexane and 250 mmoles of triethylaluminum, and the mixture was stirred for 5 minutes. To the mixture was then added 25 g of a carrier type catalyst prepared as in Examples, and the mixture was heated up to 50° C. After introducing 1.0 mole of gaseous hydrogen into the autoclave, a polymerization reaction was carried out at 50° C. for 10 hours by supplying monomeric propylene continuously so that the pressure was maintained constantly under 1.32 MPa. The resultant slurry was then separated into a cake and the solvent by the aid of a centrifugal separator and the cake was dried to obtain 40 kg of powdery polypropylene. On analysis of the resultant polypropylene, it was found that MFR was 56 g/10 min., a melting point was 156.6° C., a crystallizing temperature was 114.50° C., Mw/Mn was 2.3 and Mw was $1.13 \times 10^5$ g/mole. The ratio of isotactic pentad (mmmm) measured by $^{13}$C nuclear magnetic resonance spectra was 0.941, and the amount of 2,1- and 1,3-propylene units existing in the polymer chain was 0.43 mmole. In case of elevating the temperature of o-dichlorobenzene continuously or stepwise up to given temperatures to measure the amount of eluated polypropylene, the position of a main elution peak was 108° C. and the amount of components existing in the range of ±10° C. of the main elution peak was 97% of the total amount of components eluated at a temperature higher than 0° C. An extraction rate with boiling n-hexane was 1.5%.

Production of Pellets of Polypropylene Composition

To 100 parts by weight of the resultant powdery polypropylene were added 0.03 part by weight of tetrakis [methylene-(3,5-di-tert-butyl-4-hydroxyl-hydrocinnamate)] methane, 0.03 parts by weight of bis(2,6-di-tert-butyl-4-methylphenyl)pentaerythritol diphosphite, and 0.09 part by weight of calcium stearate, and the mixture was charged into a uniaxial extrusion-pelletizer having a screw of 40 mm$\phi$ and operated at an extrusion temperature of 190° C. to manufacture pellets of polypropylene.

Measurement of Physical Properties of Polypropylene Composition

The physical properties of polypropylene composition were measured according to the aforesaid methods and a result thereof is shown in Table 2.

Example 11

Production of Pellets of Polypropylene Composition

Pellets of polypropylene were manufactured in the same manner as described in Comparative Example 3 except that 0.15 part by weight of sodium 2,2'-methylene-bis(4,6-di-tert-butylphenyl) phosphate was added.

Measurement of Physical Properties of Polypropylene Composition

The physical properties of, the resultant polypropylene composition obtained were measured as in the foregoing Comparative Example 3 and a result thereof is shown in Table 2.

Example 12

Production of Pellets of Polypropylene Composition

Pellets of polypropylene were manufactured in the same manner as described in Comparative Example 3 except that 0.30 part by weight of 1,2,3,4-di-(p-methylbenzylidene) sorbitol was added.

Measurement of Physical Properties of Polypropylene Composition

The physical properties of the resultant polypropylene composition obtained were measured as in the foregoing Comparative Example 3 and a result thereof is shown in Table 2.

Comparative Example 4

Production of Polypropylene

In a 630 liter autoclave the air in which was sufficiently replaced with nitrogen were placed 120 liters of n-hexane and 250 mmoles of triethylaluminum, and the mixture was stirred for 5 minutes. To the mixture was then added 25 g of a carrier type catalyst prepared as in Example 1, and the mixture was heated up to 50° C. A polymerization reaction was carried out at 50° C. for 10 hours by supplying monomeric propylene continuously so that the pressure was maintained constantly under 1.32 MPa. The resultant slurry was then separated into a cake and the solvent by the aid of a centrifugal separator and the cake was dried to obtain 40 kg of powdery polypropylene.

A Result of Analysis of Polypropylene

The powdery polypropylene thus obtained was analyzed to obtain the following result:
(1) the ratio of isotactic pentad (mmmm): 0.936,
(2) the 2,1- and 1,3-propylene units in the polymer chain: 0.42 mole %,
(3) a weight average molecular weight (Mw): $1.392 \times 10^5$,
(4) Mw/Mn=2.0
(5) in case of elevating the temperature of o-dichlorobenzene continuously or stepwise up to given temperatures to measure the amount of eluated polypropylene at each temperature, the position of a main elution peak: 108° C., and the amount of components existing in the range of ±10° C. of the elution main peak: 98.5%.

Production of Pellets of Polypropylene Composition

To 100 parts by weight of the resultant powdery polypropylene were added 0.07 part by weight of 1,3,5-trimethyl-2,4,6-tris(3,5-di-tert-butyl-4-hydroxybenzyl)benzene and 0.1 part by weight of calcium stearate, and the mixture was charged into a uniaxial extrusion-pelletizer having a screw of 40 mmφ and operated at an extrusion temperature of 230° C. to manufacture pellets of polypropylene. A result of analysis of the resultant polypropylene is shown in Table 3.

Example 13

Polypropylene pellets were obtained in the same manner as described in Comparative Example 4 except that 0.02 part by weight of 1,3-bis(tert-butyl-peroxyisopropyl)benzene was added. A result of the analysis of the resultant polypropylene is shown in Table 3.

Example 14

Polypropylene pellets were obtained in the same manner as described in Comparative Example 4 except that 0.04 part by weight of 1,3-bis(tert-butyl-peroxyisopropyl)benzene was added. A result of the analysis of the resultant polypropylene is shown in Table 3.

Example 15

Polypropylene pellets were obtained in the same manner as described in Comparative Example 4 except that 0.10 part by weight of 1,3-bis(tert-butyl-peroxyisopropyl)benzene was added. A result of the analysis of the resultant polypropylene is shown in Table 3.

Example 16

Polypropylene pellets were obtained in the same manner as described in Comparative Example 4 except that 0.15 part by weight of 1,3-bis(tert-butyl-peroxyisopropyl)benzene was added. A result of the analysis of the resultant polypropylene is shown in Table 3.

Example 17

Polypropylene pellets were obtained in the same manner as described in Comparative Example 4 except that 0.023 part by weight of 2,5-dimethyl-2,5-di(tert-butyl-peroxy) hexane was added. A result of the analysis of the resultant polypropylene is shown in Table 3.

Example 18

Preparation of Carrier Type Catalyst

In a well dried 500 ml flask the air in which was replaced with $N_2$ were placed 0.39 g (0.889 mmole) of dimethylsilylene(2,3,5-trimethylcyclopentadienyl) (2',4',5'-trimethylcyclopentadienyl)zirconium dichloride and 267 mmoles of methylaluminoxane diluted with toluene (in terms of Al atom). The mixture is reacted together for 10 minutes. To this reaction mixture was added 10 g of silica (marketed by Grace Davison) baked at 800° C. for 8 hours, and the mixture was stirred for 10 minutes. While making the flask vacuum from the top of the container, a very slight stream of nitrogen was introduced into the flask from the bottom thereof. The mixture was then heated at 70° C. while the solvent was allowed to evaporate for a period of 9 hours. The resultant dried solid was cooled at room temperature overnight. In a well dried 500 ml of flask the air in which was replaced with $N_2$ were placed the resultant solid catalyst and 250 ml of isopentane, and the mixture was, cooled to 0° C. Ethylene was then introduced into the flask at a flow rate of 80 ml/min. continuously for 4 hours to effect preliminary polymerization. The supernatant liquid was then removed by decantation and the residue was washed four times with 1000 ml of isopentane by decantation. The residue was dried in vacuo for 2 hours at room temperature to prepare 35 g of a carrier type catalyst.

Production of Polypropylene

In a 630 liter autoclave in which the air was sufficiently replaced with nitrogen were place 120 liters of n-hexane and 250 mmoles of triethylaluminum, and the mixture was agitated for 5 minutes. The carrier type catalyst (25 g) as prepared above was then added to the mixture which was then heated up to 50° C. After introducing 0.61 mol of $H_2$ into the autoclave, monmeric propylene was continuously supplied to the mixture whereby polymerization was carried out for 10 hours at 50° C., while maintaining the pressure constantly under 1.32 MPa. The resultant slurry was then separated into the cake and the solvent by the aid of a centrifugal separator, and the cake was dried to obtain 42 kg of powdery polypropylene. To 100 parts by weight of the resultant powdery polypropylene were added 0.05 part by weight of tetrakis (methylene-(3,5-di-tert-butyl-4-hydroxyl-hydrocinnamate)) methane, 0.05 parts by weight of tris(2, 4-di-tert-butylphenyl) phosphite, and 0.1 part by weight of calcium stearate, and the mixture was charged into a uniaxial extrusion-pelletizer having a screw of 40 mmφ and operated at an extrusion temperature of 190° C. to manufacture pellets of polypropylene. On analysis of the resultant polypropylene, it was found that MFR was 34 g/10 min., a melting point was 155.8C, a crystallization temperature was 114.3° C., Mw/Mn was 2.2 and Mw was $1.345 \times 10^5$ g/mole. Further, the ratio of isotactic pentad (mmmm) measured by $^{13}$C nuclear magnetic resonance spectra was 0.940, and the 2,1- and 1,3-propylene units existing in the polymer chain was 0.39 mole %. In case of elevating the temperature of o-dichlorobenzene continuously or stepwise up to given temperatures to measure the amount of eluated polypropylene, the position of a main elution peak was 108° C. and the amount of components existing in the range of ±10° C. of the main elution peak was 97.9% of the total amount of components eluted at a temperature higher than 0° C.

Production of Filaments

The polypropylene obtained as above was subjected to melt-spinning by the aid of a spinning machine equipped with a nozzle having a diameter of 0.6 mm under the condition that an extrusion temperature of 230° C. and a take-up velocity of 1500 m/min., thereby to obtain raw threads. The raw threads was stretched at a stretching temperature of 60° C. and a stretch ratio of 1.3, and then mechanical crimp was imparted to the threads with a stuffer box to obtain filaments of 2 d/f. Filament strength and elongation of the resultant thread are given in Table 4.

Production of Non-woven Fabric

The threads obtained as above were subjected to carding at a rate of 20 m/min. by the aid of a roller carding machine to obtain a web having a basis weight of 20 g/m. The web was processed at the same rate to form non-woven fabric with an embossing roll having a percentage of bonded area of 24%. By varying the heating temperature of the embossing roll, the value for attaining tenacity of non-woven fabric in case of flexibility being 30 mm in lateral direction to the mechanical direction of the non-woven fabric was required, and simultaneously the value for attaining flexibility of the non-woven fabric in case of tenacity being 1.8 kg was required. These values are given in Table 4.

Comparative Example 5

Production of Carrier Type Catalyst

A carrier type catalyst was prepared in the same manner as described in Example 18 except that dimethylsilylene-bis(2-methyl-4,5-benzoindenyl)zirconium dichloride was used as metallocene in place of dimethylsilylene(2,3,5-trimethylcyclopentadienyl) (2',4',5'-trimethylcyclopentadienyl)zirconium dichloride.

Production of Polypropylene

A polymerization reaction was carried out in the same manner as described in Example 18 except that the carrier type catalyst prepared in Comparative Example 5 was used in place of the carrier type catalyst prepared in Example 18, the introduced gaseous hydrogen was 0.7 mole, and the polymerization pressure was 1.08 MPa, whereby 40 kg of polypropylene was produced. Polypropylene pellets were then manufactured in the same manner as described in Example 18, and the resultant polypropylene was subjected to analysis whereupon it was found that MFR was 34 g/10 min., a melting point was 145.7° C., a crystallizing temperature was 108.6° C., Mw/Mn was 2.5 and Mw was $1.324 \times 10^5$ g/mole. The ratio of isotactic pentad (mmmm) measured by $^{13}$C nuclear magnetic resonance spectra was 0.900, and the amount of 2,1- and 1,3-propylene unit existing in the polymer chain was 1.84 mmoles. An extraction rate of unwoven fabric with boiling n-hexane was 13.3%.

In case of elevating the temperature of o-dichlorobenzene continuously or stepwise up to given temperautres to measure the amount of eluate polypropylene, the position of a main elution peak was 96° C. and the amount of components existing in the range of +10° C. of the main eluation peak was 94.9% of the total amount of components eluted at a temperature higher than 0° C.

Production of Filaments and Production of Non-woven Fabric

Filaments and non-woven fabric were manufactured in the same manner as described in Example 18 except that the polypropylene as produced above was used. A result of producing these products is shown in Table 4.

Comparative Example 6

Production of Polypropylene

To 100 parts by weight of the powdery polypropylene obtained in Comparative Example 1 were added 0.05 part by weight of tetrakis[methylene(3,5-di-tert-butyl-4-hydroxyl-hydrocinnamate)]methane, 0.1 part by weight of tris(2,4-di-tert-butylphenyl) phosphite, 0.1 part by weight of calcium stearate, and 0.05 part by weight of 1,3-bis(tert-butyl-peroxyisopropyl)benzene. The resultant mixture was charged into a uniaxial extrusion-pelletizer having a screw of 40 mmo and operated at an extrusion temperature of 190° C. to manufacture pellets of polypropylene.

On analysis of the resultant polypropylene, it was found that MFR was 36 g/10 min., a melting point was 158.1° C., a crystallizing temperature was 118.3° C., Mw/Mn was 3.1 and Mw was $1.424 \times 10^5$ g/mole. Further, the ratio of isotactic pentad (mmmm) measured by $^{13}$C nuclear magnetic resonance spectra was 0.927, and the 2,1- and 1,3-propylene units existing in the polymer chain was below the lower limit (0.02 mole %) of the detectable range of the measurement apparatus.

In case of elevating the temperature of o-dichlorobenzene continuously or stepwise up to given temperatures to measure the amount of eluated polypropylene, the position of a main elution peak was 116° C. and the amount of components existing in the range of ±10° C. of the main eluation peak was 82.4% of the total amount of components eluated at a temperature higher than 0° C.

Production of Filaments and Production of Non-woven Fabric

Filaments and non-woven fabric were manufactured in the same manner as described in Example 18 except that the polypropylene as produced above was used. A result of producing these products is shown in Table 4.

Comparative Example 7

To 100 parts by weight of the powdery polypropylene obtained in Comparative Example 2 were added 0.05 part by weight of tetrakis [methylene(3,5-di-tert-butyl-4-hydroxyl-hydrocinnamate)]methane, 0.1 part by weight of tris(2,4-di-tert-butyl-phenyl) phosphite, 0.1 part by weight of calcium stearate, and 0.05 part by weight of 1,3-bis(tert-butyl-peroxyisopropyl)benzene, and the resultant mixture was charged into a uniaxial extrusion-pelletizer having a screw of 40 mmφ and operated at an extrusion temperature of 190° C. to manufacture pellets of polypropylene. On analysis of the resultant polypropylene, it was found that MFR was 35 g/10 min., a melting point was 160.5° C., a crystallizing temperature was 106.4° C., Mw/Mn was 3.4 and Mw was $1.420 \times 10^5$ g/mole. Further, the ratio of isotactic pentad (mmmm) measured by $^{13}C$ nuclear magnetic resonance spectra was 0.949, and the 2,1- and 1,3-propylene units existing in the polymer chain was not detected. In case of elevating the temperature of o-dichlorobenzene continuously or stepwise up to given temperatures to measure the amount of eluated polypropylene, the position of a main elution peak was 118° C. and the amount of components existing in the range of ±10° C. of the main elution peak was 89.3% of the total amount of components eluated at a temperature higher than 0° C.

Production of Filaments and Production of Non-woven Fabric

Filaments and non-woven fabric were manufactured in the same manner as described in Example 18 except that the polypropylene as produced above was used. The result is shown in Table 4.

TABLE 1

| Item | Example 9 | Comparative Example 1 | Comparative Example 2 |
| --- | --- | --- | --- |
| MFR (g/10 min.) | 56 | 71 | 70 |
| Ratio of isotactic pentad (mmmm) | 0.941 | 0.921 | 0.949 |
| Mis-insertion (mole %)*1 | 0.43 | not detected | not detected |
| Melting point (° C.) | 156.5 | 158.0 | 160.6 |
| Crystallizing temperature (° C.) | 114.5 | 118.4 | 106.4 |
| Mw | 122300 | 120600 | 126000 |
| Mw/Mn | 2.3 | 3.0 | 3.2 |
| Ep (° C.)*2 | 108 | 116 | 118 |
| E ± 10*3 | 97 | 82.3 | 89.2 |
| Young's modulus (MPa)*4 | 850 | 560 | 640 |
| Haze (%)*5 | 1.0 | 6.0 | 4.4 |

(Remarks)
*¹2,1- and 1,3-propylene units existing in the polymer chain
*²in case of elevating the temperature of o-dichlorobenzene continuously or stepwise up to given temperatures to measure the amount of eluated polypropylene at each temperature, the position of a main elution peak (° C.)
*³a ratio of the amount of components existing in the range of ±10° C. of the main elution peak to the total amounts of components eluated at a temperature higher than 0° C.
*⁴thickness of film: 20 μm
*⁵inner Haze value: thickness of film 50 μm; (In case of Haze value, smaller the value, better the transparency.)

TABLE 2

| Item | Example 11 | Example 12 | Comparative Example 3 |
| --- | --- | --- | --- |
| MFR (g/10 min.) | 55 | 51 | 56 |
| Melting point (° C.) | 158.7 | 158.8 | 156.6 |
| Crystallizing temperature (° C.) | 127.3 | 129.3 | 114.5 |
| Mw | 113800 | 113000 | 113000 |
| Mw/Mn | 2.2 | 2.4 | 2.3 |
| Bending elasticity (MPa) | 1780 | 1630 | 1450 |

TABLE 2-continued

| Item | Example 11 | Example 12 | Comparative Example 3 |
| --- | --- | --- | --- |
| Heat Deformation temperature (° C.) | 132.3 | 130.1 | 124.9 |
| Haze (Dim rate) | 50.4 | 18 | 60.1 |

TABLE 3

| Item | Com Ex 4 | Ex 13 | Ex 14 | Ex 15 | Ex 16 | Ex 17 |
| --- | --- | --- | --- | --- | --- | --- |
| Radical generator (Wt part) | 0 | 0.02 | 0.04 | 0.10 | 0.15 | 0.023 |
| MFR (g/min.) | 2.4 | 41.9 | 68.1 | 147 | 149 | 41.0 |
| Melting point (° C.) | 155.5 | 155.4 | 155.2 | 154.8 | 155.0 | 155.6 |
| Crystallizing temperature (° C.) | 114.0 | 114.2 | 115.0 | 113.7 | 113.9 | 114.0 |
| Mw (×10⁵) | 1.45 | 1.31 | 1.14 | 1.09 | 1.02 | 1.30 |
| Mw/Mn | 2.2 | 2.1 | 2.1 | 2.0 | 2.1 | 2.0 |

(Remarks)
Com Ex stands for Comparative Example and Ex for Example.

TABLE 4

| Item | Ex 18 | Com Ex 5 | Com Ex 6 | Com Ex 7 |
| --- | --- | --- | --- | --- |
| MFR (g/10 min.) | 34 | 34 | 36 | 35 |
| Ratio of isotactic pentad (mmmm) | 0.940 | 0.900 | 0.927 | 0.949 |
| Mis-insertion (mole %) | 0.39 | 1.84 | not detected | not detected |
| Melting point (° C.) | 155.8 | 145.7 | 158.1 | 160.5 |
| Crystallizing temperature (° C.) | 114.3 | 108.6 | 118.3 | 106.4 |
| Mw | 134500 | 132400 | 142400 | 142000 |
| Mw/Mn | 2.2 | 2.5 | 3.1 | 3.4 |
| Ep (° C.) | 108 | 96 | 116 | 118 |
| E + 10 (%) | 97.9 | 94.9 | 82.4 | 89.3 |
| Tenacity of filament | 2.3 | 1.9 | 1.4 | 1.5 |
| Elongation of filament (%) | 320 | 240 | 240 | 240 |
| Tenacity of non-woven fabric (kg)*6 | 3.1 | 1.8 | 2.1 | 2.2 |
| Flexibility (mm)*7 | 20 | 30 | 28 | 28 |

(Remarks)
The notations are identical with those given in Tables 1 and 3.
*⁶Tenacity of non-woven fabric in case of flexibility of non-woven fabric in lateral direction being 30 mm. (the larger the value, the stronger the tenacity in case of flexibility being same)
*⁷Flexibility in lateral direction of unwoven fabric in case of tenacity of the non-woven fabric being 1.8 kg. (the smaller the value, the more excellent in flexibility in case of the same tenacity of the non-woven fabric)

What is claimed is:
1. A process for producing high molecular weight olefin polymers or copolymers at a polymerization temperature within the range of 40–90° C. by the aid of a catalyst system comprised predominantly of the following compounds (A), (B) and (C), which comprises polymerizing olefin monomers by the aid of a catalyst system comprised of the compounds (A), (B) and (C) conjointly with an organoaluminum compound (D) whereby the polymerization time or an average retention time in a polymerization reactor is selected within the range of 1–20 hours to make a weight average molecular weight of the resultant olefin polymers or copolymers obtained by gel permeation chromatography adjustable within the range of 30,000–10,000,000 at need: the compound (A) being a transition metal compound of the general formula:

$$Q(C_5H_{4-m}R^1{}_m)(C_5H_{4-n}R^2{}_n)MXY$$

wherein $(C_5H_{4-m}R^1{}_m)$ and $(C_5H_{4-n}R^2{}_n)$ each stand for a substituted cyclopentadienyl group, m and n each stands for an integer of 1–3, $R^1$ and $R^2$ may be the same or different and each stands for a hydrocarbon group with 1–20 carbon atoms, a silicon-containing hydrocarbon group, and a hydrocarbon group forming at least one hydrocarbon ring which may be substituted by hydrocarbon groups connected to two carbon atoms on the cyclopentadienyl ring, with the proviso that a symmetrical plane containing M is not existent in the position on the cyclopentadienyl ring of $R^1$ and $R^2$ and that $R^1$ or $R^2$ is existent in at least one carbon atom adjacent to the carbon atom connected to Q in at least one cyclopentadienyl ring, Q stands for a bivalent hydrocarbon radical, unsubstituted silylene radical or a hydrocarbon-substituted silylene radical bridging the groups $(C_5H_{4-m}R^1{}_m)$ and $(C_5H_{4-n}R^2{}_n)$ M stands for a transition metal Ti, Zr or Hf, and X and Y may be the same or different and each stands for a hydrogen atom, a halogen atom or a hydrocarbon group, the compound (B) being an aluminoxane, and the compound (C) being a finely particulate carrier.

2. A process for producing the aforesaid olefin polymers or copolymers according to claim 1, wherein the polymerization time or an average retention time in a polymerization reactor is within the range of 2–12 hours.

3. A process for producing the aforesaid olefin polymers or copolymers according to claim 1, wherein the compound (D) is used in a molar ratio within the range of 1–10,000 moles per mole of the transition metal of the compound (A).

4. A process for producing the aforesaid olefin polymers or copolymers according to claim 1, wherein the compound (D) is used in a molar ratio within the range of 50–2,000 moles per mole of the transition metal of the compound (A).

5. A process for producing the aforesaid olefin polymers or copolymers according to claim 1, wherein the compound (D) is selected from triethylaluminum, triisobutylaluminum or a mixture of both in a mixing ratio of 10:90 to 90:10.

6. A process for producing the aforesaid olefin polymers or copolymers according to claim 1, wherein the compound (A) is dimethylsilylene(2,3,5-trimethylcyclopentadienyl)(2',4',5'-trimethylcyclopentadienyi)zirconium dichloride.

7. Olefin polymers or copolymers wherein:

(1) a weight average molecular weight (Mw) is 30,000–1,000,000, (2) a ratio of isotactic pentad is 0.900–0.949, (3) the 2,1- and 1,3-propylene units in the polymer chain is 0–1 mole %, (4) a ratio of a weight average molecular weight (Mw) to a number average molecular weight (Mn), i.e. (Mw)/(Mn) is 1.5–3.8, and (5) in case of elevating the temperature of o-dichlorobenzene continuously or stepwise up to given temperatures to measure the amount of eluated polyolefin at each temperature, the position of a main elution peak is at least 95° C. and the amount of components existing in the range of ±10° C. of the main elution peak is at least 90% of the total amounts of components eluated at a temperature higher than 0° C.

8. Olefin polymers or copolymers according to claim 7, wherein the amount of components existing in the range of ±10° C. of the main elution peak is at least 95% of the total amounts of components eluated at a temperature higher than 0° C.

9. Olefin polymers or copolymers according to claim 7, wherein the melting point of the polymers or copolymers is 147–160° C.

10. Olefin polymers or copolymers according to claim 7, wherein an extraction rate of the polymer or copolymer with n-heptane is 0–10%.

11. Olefin polymers or copolymers according to claim 7, wherein the polymer is a homopolymer of propylene, a propylene-olefin random copolymer containing at least 50% by weight of propylene units or a propylene-olefin block copolymer.

12. Polypropylene according to claim 7, which has been produced by the aid of a catalyst system comprised predominantly of the following compounds (A), (B), (C) and (D):

the compound (A) being a transition metal compound of the general formula:

$$Q(C_5H_{4-m}R^1{}_m)(C_5H_{4-n}R^2{}_n)MXY$$

wherein $(C_5H_{4-m}R^1{}_m)$ and $(C_5H_{4-n}R^2{}_n)$ each stand for a substituted cyclopentadienyl group, m and n each. stands for an integer of 1–3, $R^1$ and $R^2$ may be the same or different and each stands for a hydrocarbon group with 1–20 carbon atoms, a silicon-containing hydrocarbon group, with the proviso that a symmetrical plane containing M is not existent in the position on the cyclopentadienyl ring of $R^1$ and $R^2$ and that $R^1$ or $R^2$ is existent in at least one carbon atom adjacent to the carbon atom connected to Q in at least one cyclopentadienyl ring, Q stands for a bivalent hydrocarbon radical, unsubstituted silylene radical or a hydrocarbon-substituted silylene radical bridging the groups $(C_5H_{4-m}R^1{}_m)$ and $(C_5H_{4-n}R^2{}_n)$ M stands for a transition metal Ti, Zr or Hf, and X and Y may be the same or different and each stands for a hydrogen atom, a halogen atom or a hydrocarbon group, the compound (B) being an aluminoxane, the compound (C) being a finely particulate carrier, and the compound (D) an organoaluminum compound.

13. Polypropylene according to claim 12, wherein the compound (A) is dimethylsilylene(2,3,5-trimethylcyclopentadienyl) (2',4',5'-trimethylcyclopentadienyl)zirconium dichloride.

14. Moldings manufactured from polypropylene according to claim 7.

15. Polypropylene according to 7, wherein (1) a ratio of isotactic pentad (mmmm) is 0.900–0.949, (2) the 2,1- and 1,3-propylene units in the polymer chain is 0–1 mole %, (3) a weight average molecular weight (Mw) is 40,000–1,000,000, (4) a ratio of a weight average molecular weight (Mw) to a number average molecular weight (Mn), i.e. (Mw)/(Mn) is 1.5–3.8, and (5) in case of elevating the temperature of o-dichlorobenzene continuously or stepwise up to given temperatures to measure the amount of eluated polypropylene at each temperature, the position of a main elution peak is at least 95° C. and the amount of components existing in the range of ±10° C. of the main elution peak is at least 90% of the total amounts of components eluated at a temperature higher than 0° C.

16. Polypropylene according to claim 15, wherein the melting point is 147–160° C.

17. Polypropylene according to claim 15, wherein an isolation rate of the polymer with n-heptane is 0–10%.

18. Injection moldings of polypropylene manufactured from polypropylene according to claim 15.

19. Polypropylene films manufactured from polypropylene according to claim 15.

20. A polypropylene composition wherein polypropylene according to claim 15 in an amount of 100 parts by weight is incorporated with 0.0001–1 part by weight of an α-form nucleating agent.

21. A polypropylene composition according to claim 20, wherein the α-form nucleating agent is at least one selected from the group consisting of talc, a metal salt of an aromatic carboxylic acid, a dibenzylidenesorbitol compound, a metal salt of an aromatic phosphoric acid, poly(3-methyl-1-butene), polyvinylcyclohexane and polyallyltrimethylsilane.

22. A modified polypropylene composition wherein the polypropylene according to claims 15 in an amount of 100 parts by weight has been incorporated with a radical generator in an amount of 0.001–0.5 parts by weight and then the mixture as a main component has been subjected to a melt-kneading treatment.

23. Polypropylene filaments or fibers having an elongation of at least 200% molded from polypropylene according to claim 15.

24. Non-woven fabric made of the polypropylene filaments or fibers according to claim 23.

* * * * *